United States Patent
Tsirtsis

(10) Patent No.: US 9,155,118 B2
(45) Date of Patent: Oct. 6, 2015

(54) MULTI-LINK SUPPORT FOR NETWORK BASED MOBILITY MANAGEMENT SYSTEMS

(75) Inventor: George Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 1029 days.

(21) Appl. No.: 12/015,432

(22) Filed: Jan. 16, 2008

(65) Prior Publication Data

US 2008/0298303 A1    Dec. 4, 2008

Related U.S. Application Data

(60) Provisional application No. 60/885,982, filed on Jan. 22, 2007.

(51) Int. Cl.
| | |
|---|---|
| *H04W 76/02* | (2009.01) |
| *H04W 60/00* | (2009.01) |
| *H04L 29/06* | (2006.01) |
| *H04W 8/06* | (2009.01) |
| *H04W 8/08* | (2009.01) |
| *H04W 28/16* | (2009.01) |
| *H04W 40/36* | (2009.01) |
| *H04W 80/04* | (2009.01) |
| *H04W 88/18* | (2009.01) |

(52) U.S. Cl.
CPC ............. *H04W 76/025* (2013.01); *H04L 69/14* (2013.01); *H04W 60/005* (2013.01); *H04W 8/06* (2013.01); *H04W 8/087* (2013.01); *H04W 28/16* (2013.01); *H04W 40/36* (2013.01); *H04W 80/04* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 2004/0136348 A1 | 7/2004 | Han | |
| 2005/0060425 A1* | 3/2005 | Yeh et al. | 709/232 |
| 2006/0002344 A1* | 1/2006 | Ono et al. | 370/331 |
| 2006/0120327 A1 | 6/2006 | Suh | |
| 2006/0209759 A1 | 9/2006 | Vesterinen | |
| 2006/0215599 A1* | 9/2006 | Nakatugawa et al. | 370/328 |

(Continued)

FOREIGN PATENT DOCUMENTS

| | | |
|---|---|---|
| JP | 2004080791 A | 3/2004 |
| JP | 2005518735 A | 6/2005 |

(Continued)

OTHER PUBLICATIONS

International Search Report, PCT/US08/051580, International Search Authority, European Patent Office, Jul. 15, 2008.

(Continued)

*Primary Examiner* — Jae Y Lee
*Assistant Examiner* — Tito Pham
(74) *Attorney, Agent, or Firm* — Michelle S. Gallardo

(57) ABSTRACT

The claimed subject matter relates to systems and methods for processing messages in a wireless communications environment. In an aspect, a communications method is provided. The method includes establishing a communications link though an access component with a network domain node and enabling at least one other communications link through at least one other access component with the network domain node. This also includes enabling concurrent communications with the network domain node via the access component or the other access component.

35 Claims, 14 Drawing Sheets

(56) References Cited

U.S. PATENT DOCUMENTS

| | | | |
|---|---|---|---|
| 2006/0240827 A1* | 10/2006 | Dunn et al. | 455/436 |
| 2007/0022476 A1* | 1/2007 | Bae et al. | 726/15 |
| 2007/0297377 A1* | 12/2007 | McCann et al. | 370/338 |
| 2008/0137625 A1 | 6/2008 | Hori et al. | |
| 2008/0256220 A1* | 10/2008 | Bachmann et al. | 709/222 |
| 2009/0103454 A1* | 4/2009 | Watanabe et al. | 370/254 |
| 2010/0097977 A1* | 4/2010 | Rommer et al. | 370/315 |

FOREIGN PATENT DOCUMENTS

| | | |
|---|---|---|
| JP | 2006141023 A | 6/2006 |
| JP | 2008502213 A | 1/2008 |
| JP | 2008526096 A | 7/2008 |
| RU | 2273104 | 3/2006 |
| WO | WO03032604 A1 | 4/2003 |
| WO | WO03071821 A1 | 8/2003 |
| WO | WO2005119978 A1 | 12/2005 |
| WO | WO2005119989 A1 | 12/2005 |
| WO | WO2006068557 A1 | 6/2006 |
| WO | WO2006073084 A1 | 7/2006 |

OTHER PUBLICATIONS

Written Opinion, PCT/US08/051580, International Search Authority, European Patent Office, Jul. 15, 2008.

Fikouras et al., "Filters for Mobile IPv4 Bindings (NOMADv4)," IETF Standard-Working-Draft, Oct. 10, 2003, Internet Engineering Task Force, CH, XP015033272.

Gomez, "Initial Evaluation of State of the Art Mobile IPv6 Alternatives," Dec. 22, 2006, Internet Reference, XP002486642.

D. Johnson, Rice University: C. Perkins, Nokia Research Center; J. Arkko, Ericsson; "Mobility Support in IPV6"; Jun. 2004; Network Working Group, Request for Comments: 3775, Category: Standards Track; http://tools.ietf.org/html/rfc3775.

K. Leung, Cisco; M. Liebsch, NEC; P. Roberts, Motorola; K. Nishida, NTT DoCoMo Inc.; H. Yokota, KDDI Labs; M. Parthasarathy, Nokia; H. Levkowetz, Ericsson; Jun. 19, 2006; "NETLMM Protocol"; NETLMM G. Giaretta, Internet-Draft Telecom Italia. http://tools.ietf.org/draft/draft-giaretta-netlmm-dt-protocol/draft-giaretta-netlmm-dt-protocol-00.txt.

C. Perkins, Ed., Nokia Research Center; "IP Mobility Support for IPV4", Aug. 2002; Network Working Group, Request for Comments: 3344, Obsoletes: 3220 Category: Standards Track; http://tools.ietf.org/html/rfc3344.

Gomez, "Initial evaluation of state of the art mobile IPv6 alternatives", Dec. 22, 2006 Objection to claims: 1,6, 8-11, 14, 17, 22-24, 27, 32 and 33.

Hsu Ching-Fang et al., "Performance Analysis of Deflection Routing in Optical Burst-Switched Networks", Proceedings IEEE Twenty-First Annual Joint Conference of the IEEE Computer and Communications Societies, INFOCOM 2002, 2002, vol. 1, 66-73.

Kuladinithi Koojana et al., "Mobility Management for an Integrated Network Platform", 4th International Workshop on Mobile and Wireless Communications Network, 2002, 621-625.

Mykoniati Eleni et al., "Admission Control for Providing QoS in DiffServ IP Networks: The TEQUILA Approach", 2003, IEEE Communications Magazine, 38-44.

Taiwan Search Report—TW097102425—TIPO—Aug. 2, 2011.

Wakikawa R., et.al., Multiple Care-of Addresses Registration, Internet Draft, draft-wakikawa-mobileip-multiplecoa-05, Feb. 2006, pp. 1-36.

* cited by examiner

MULTI-LINK SUPPORT FOR NETWORK BASED MOBILITY MANAGEMENT SYSTEMS

CROSS REFERENCE TO RELATED APPLICATION

This application claims the benefit of U.S. Provisional Patent Application No. 60/885,982, entitled A METHOD AND APPARATUS FOR MULTI-LINK SUPPORT FOR NETWORK BASED MOBILITY MANAGEMENT, and filed on Jan. 22, 2007, the entirety of which is incorporated herein by reference.

BACKGROUND

1. Field

The following description relates generally to communications systems, and more particularly to enabling concurrent communications links over multiple access nodes.

2. Background

Communication networks, such as wireless communication networks, broadband networks, and other suitable networks are utilized in connection with transferring data, wherein data can include word processing files, streaming video, multimedia files, voice data, and/or the like. Such networks are often employed with protocols such as Internet Protocol (IP) for transferring data in accordance with a public network such as the Internet. An extension of IP protocols relates to mobile devices and is known as Mobile Internet Protocol (MIP). Another variant is Proxy Mobile Internet Protocol (PMIP). Such mobile protocols are often employed with a network domain that includes nodes such as access nodes and Local Mobility Anchors (LMA) for example that often employ the mobile IP protocols in conjunction with a domain protocol to manage the respective devices within the domain.

One such domain protocol is referred to as a Network-based Localized Mobility Management (NETLMM) protocol. In contrast to MIP protocol which is considered a global mobility management protocol to control IP links as communications devices change location, NETLMM and PMIP help localize the management of topologically small device movements. Limiting the reach of the respective protocol responsibilities is more preferable to handle local movements since protocol complexities are reduced. Generally, NETLMM provides for efficient support for mobile nodes communicating with peers both outside and inside the same mobility domain when mobile nodes move across different access routers (or nodes, or points). These movements typically require no extra host stack support or complex security and signaling interactions between mobile node and the respective access network. By utilizing the neighbor access router information in the domain, NETLMM can achieve very fast and smooth handover performance to suit the requirements of most real-time and interactive multimedia applications.

Network based mobility management systems employing technologies such as NETLMM, PMIP are generally considered mobility management systems that do not require mobility management signaling from a mobile device to operate. Instead, the network or domain changes message routing within the network based on link layer or other triggers. A well understood limitation of such mechanisms is that they can only operate with mobiles that maintain a single link to the network. In other words the mobility management system points to a single point of attachment for each mobile. Since the mobile is assumed to have only one link with an NETLMM domain for example, at any one time the NETLMM protocol must ensure that the local mobility anchor (LMA) redirects the mobile device's traffic to the correct access router i.e., the access router the mobile is connected to. To perform this operation, access routers send registration messages to the LMA when a mobile device creates a link with the LMA. Assuming the mobile device can only have one link at the time, the order in which the registration messages reach the LMA is assumed to be the same as the order in which the mobile device creates links with different access routers. This assumption can hold if the movement between access routers is not very frequent. More specifically, the assumption holds when the time between link creations is larger than the time it takes for the access router to register with the LMA.

Referring to prior art FIG. 10, an example domain 1000 is illustrated. The domain 1000 includes an LMA 1010 that communicates with access nodes (AN) (or routers) 1020 and 1030. The AN's 1020,1030 communicate with access point (AP) groups 1040 and 1050 respectively, where such groups may service a mobile device 1060. The mobile device 1060 maintains a link with Access Point 2 (AP2) 1070, which is directly connected to the AN at 1020. In this example, NETLMM protocol schemes work relatively well since only movement between ANs 1020 and 1030 is triggering NETLMM device registrations, while movement between APs at 1040 or 1050 under the same AN 1020 or 1030 do not trigger such registrations. Even in this case, however, movement between AP2 at 1070 and AP4 at 1080 can cause out of order delivery of the registrations to the LMA 1010, if for example the mobile device moves too fast or if it moves back and forth between AP2 1070 and AP4 1080, a condition commonly referred to as "ping-pong." As can be appreciated, back and forth movements can cause communications problems within the domain 1000.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Signaling components and processing logic are provided that enables the use of multiple concurrent links (or connections) in a network-based mobility management system. This can be achieved by processing events or triggers corresponding to a link as independent from other links. When multiple links are being supported concurrently, usage of the link to deliver traffic (e.g., forwarding of packets and/or distribution of various traffic flows) may be governed by predetermined policy, explicitly signaled policy, or a combination thereof. In other aspects, the signaling components employ quality of service (QoS) signaling and/or admission control decisions to trigger the creation of flow/application specific routes in the network. For instance, when a mobile device has multiple links to a network QoS signaling can be employed to request resources on a specific link. This QoS reservation process (e.g., the signaling and/or admission control associated with supporting QoS) triggers the creation of a flow specific route that points to the link over which the reservation was made.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate concurrent messaging in network-based mobility management systems. In an aspect, a communications method is provided. The method includes establishing a communications link though an access component with a network domain node and enabling at least one other communications link through at least one other access component with the network domain node. This also includes enabling concurrent communications with the network domain node via the access component or the other access component.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of what is described herein.

Figure 1:
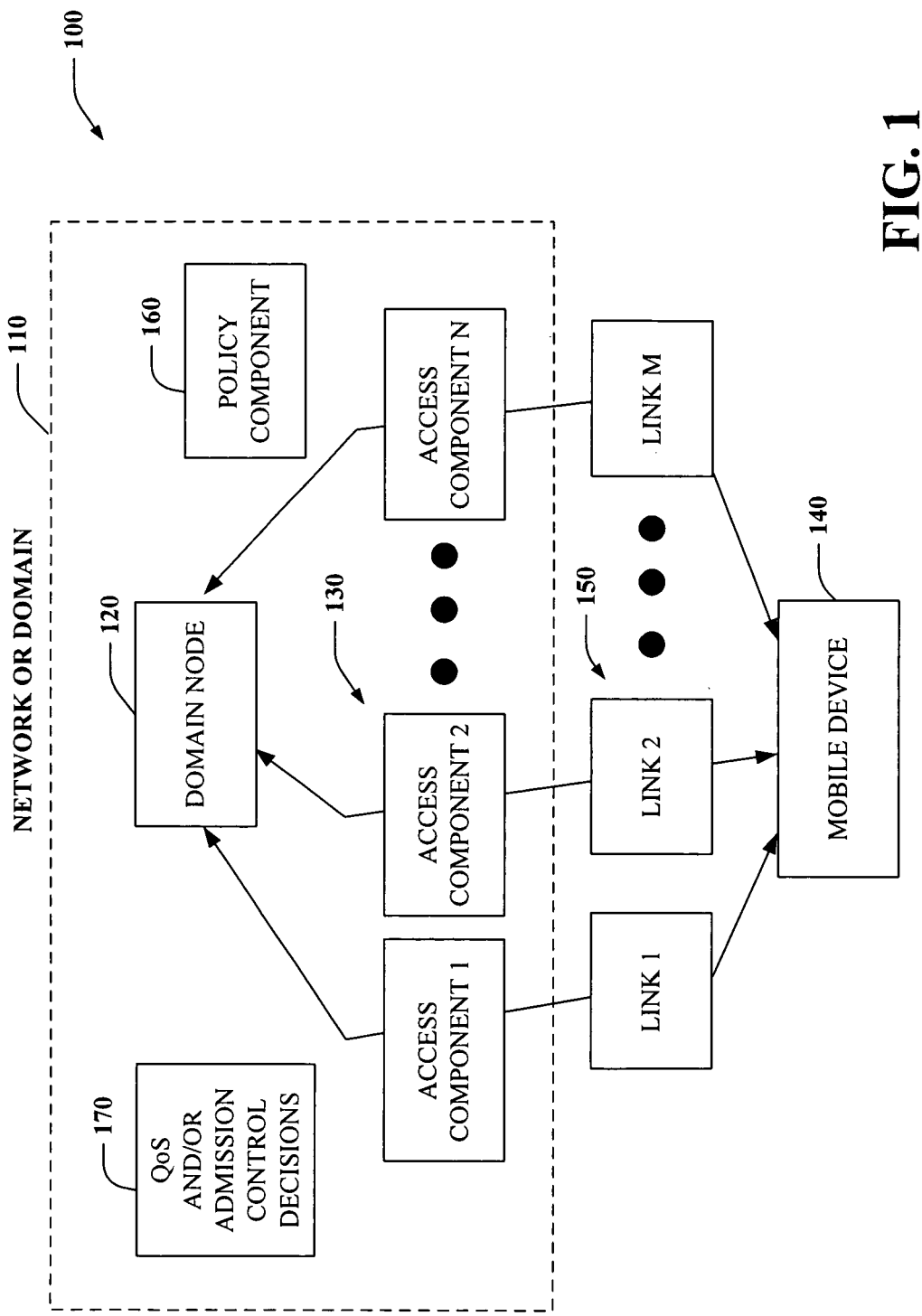
FIG. 1 is a high level block diagram of a system that is provided to illustrate concurrent messaging in a communications environment.

Referring now to FIG. 1, a system 100 illustrates concurrent messaging principles in a communications environment. A network or domain 110 includes at least one domain node 120 that communicates to one or more access components 130, where the access components can include interface points to the domain such as access nodes, access routers, base stations, and so forth. A mobile device 140 attempts to establish one or more concurrent communications links 150 with the domain node 120 via the access components 130. For instance, the mobile device 140 may attempt to form a first communications link via a first access component at 130 and after moving to another location, the mobile device forms a subsequent link such as through a second access component at 130. As can be appreciated, a plurality of such communications links can be formed between the mobile device 140, access components 130, and the domain node 120. As illustrated, a policy component 160 provides rules or controls for supporting the communications links 150. A quality of service (QoS) component 170 which can include one or more admission control decisions is employed to create flow or application specific message routes in the system 100. The policy component 160 and the QoS component 170 are described in more detail below with respect to FIGS. 2-4.

In one aspect, the sequence data can be employed for message ordering in a network-based mobility management system to facilitate orderly communications within the domain 110. During registration of a communication channel between the mobile device 140 and the domain node 120 in the domain 110 such as a Local Mobility Anchor (LMA) for example, sequential information or data can be applied to the registration to facilitate ordering of messages in the domain 110 and with respect to the mobile device 140. Sequential data 150 can take the form of a sequence number or timestamp information for example that can be assigned by the device 140 or proxy node within the domain 110.

In one specific example, the system 100 can employ Proxy Mobile Internet Protocol (PMIP). Such mobile protocols are often employed with a network domain 110 that includes nodes such as access nodes and Local Mobility Anchors (LMA) for example that often employ the mobile IP protocols in conjunction with a domain protocol to manage the respective devices within the domain 110. One such domain protocol is referred to as a Network-based Localized Mobility Management (NETLMM) protocol. In one aspect, PMIP and NETLMM potentially suffer from out of order delivery of mobility management messages from different access components 130 to the domain node 120. If messages reach the domain node 120 out of order, the domain node can send traffic to the wrong access component 130. Thus, in one example, PMIP/NETLMM messages from the access components 130 are triggered by on the event of communication link creation as will be described in more detail with respect to FIG. 2. This can take different forms, including some form of an L2 connection request, e.g., Address Resolution Protocol (ARP), Neighbor Discovery (ND), Dynamic Host Configuration Protocol (DHCP) or other protocol. Other protocols that can be employed by the system 100 include resource reservation protocol (RSVP), local RSVP, next steps in signaling (NSIS) protocol, and MARC, communications protocol for example.

It is noted that the terminal or mobile device 140, can be, for instance, a module such as an SD card, a network card, a wireless network card, a computer (including laptops, desktops, personal digital assistants PDAs), mobile phones, smart phones, or any other suitable terminal that can be utilized to access a network. The mobile device 140 accesses the network by way of an access component 130. In one example, a connection between the mobile device 140 and the access components 130 may be wireless in nature, in which access components may be a base station and the mobile device may be a wireless terminal. For instance, the device 140 and access component 130 may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Similarly to the mobile device 140, the access components 130 can be an access node associated with a wired network or a wireless network. To that end, access component 130 can be, for instance, a router, a switch, or the like. The access component 130 can include one or more interfaces, e.g., communication modules, for communicating with other network nodes. Additionally, the access component 130 may be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
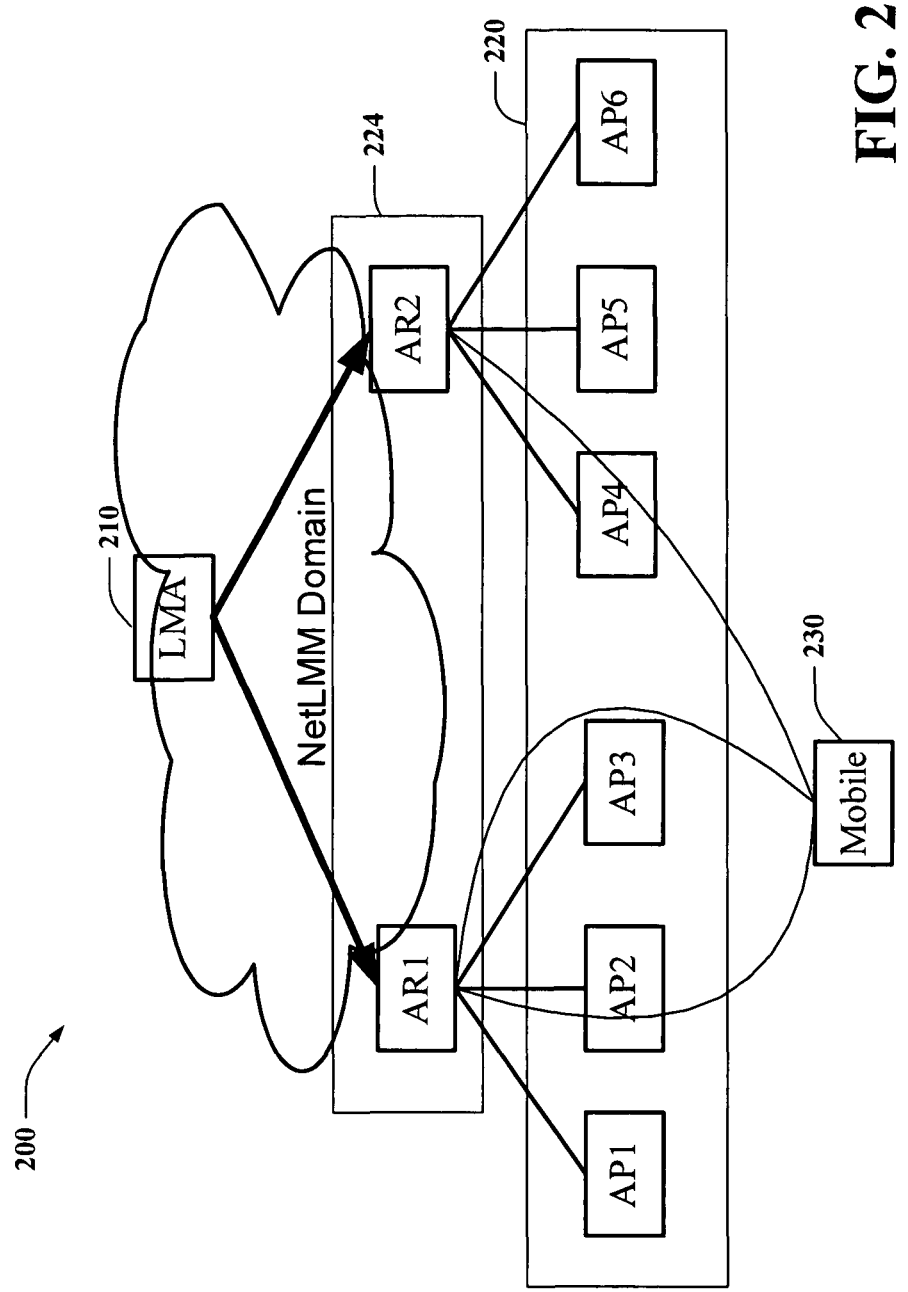
FIG. 2 is a block diagram of an example network access system that can form concurrent communications links.

Referring now to FIG. 2, an example network access system 200 is illustrated that can form multiple concurrent communications links and facilitate message ordering. The system 200 includes a local mobility anchor (LMA) 210 that communicates to one or more access points 220 and access components 224 to a mobile device 230. The system 200 employs signaling components and processing logic that enables the use of multiple concurrent links (or connections) in a network-based mobility management system. This can be achieved by processing events (e.g., triggers) corresponding to a link as independent from other links (e.g., when a new link is established it does not necessarily indicate that a previous link has been lost or dropped). When multiple links are being supported concurrently, usage of the link to deliver traffic (e.g., forwarding of packets and/or distribution of various traffic flows) can be governed by predetermined policy, explicitly signaled policy, or a combination thereof which is described in more detail below with respect to FIG. 3.

In other aspects, the signaling components (can be associated with the (LMA 210 or the access components 224) employ quality of service (QoS) signaling and/or admission control decisions to trigger the creation of flow/application specific routes in the network. For instance, when a mobile device has multiple links to a network QoS signaling (e.g., RSVP, LocalRSVP, NSIS, MARC or other) can be used to request resources on a specific link. This QoS reservation process (e.g., the signaling and/or admission control associated with supporting QoS), according to an aspect, triggers the creation of a flow specific route that points to the link over which the reservation was made.

Figure 3:
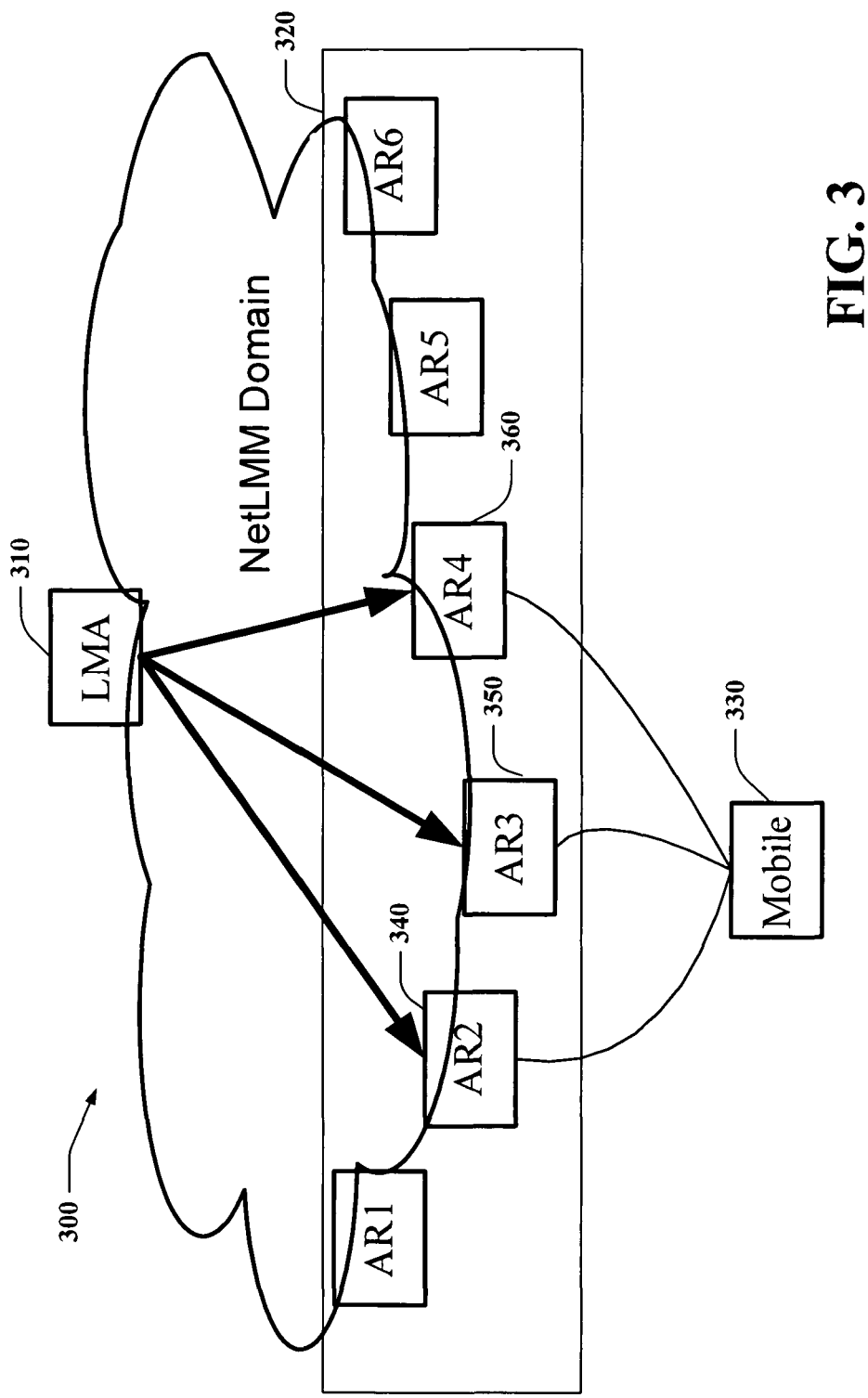
FIG. 3 is a block diagram that illustrates an alternative architecture that supports concurrent communications links.

Now referring to FIG. 3, an alternative system 300 illustrates concurrent messaging flows. Before proceeding, it is noted that the protocols and rules described with respect to FIG. 3 can also be applied top the architecture depicted in FIG. 2. Similarly, the concepts described with respect to FIGS. 1 and 2 can also be applied to the system 300. In this example, an LMA 310 communicates with one or more access components 320 (e.g., access routers) to a mobile device 330. The system 300 illustrates how based on the protocols described herein that the LMA 310 can redirect some traffic to AR2 340 in this example and some other traffic to AR3 350, and some other traffic to AP4 360.

The Local Mobility Agent (LMA) 310 is a general term that is used for the mobility agent in various NetLMM schemes (or other network protocols). The LMA 310 can be a modified Home Agent (HA), for example. One of the NetLMM protocol proposals is based on Mobile IP, in which case it is often called Proxy Mobile IP (PMIP). According to an aspect, the NetLMM protocol reacts to one or more types of triggers including Link state triggers and QoS triggers, for example. Link State triggers represent the state of a given link. For example a link may become operational (Link-Up) or may become broken (Link-Down). The QoS triggers represent reservation requests from a mobile or a network device on behalf of the mobile. For example, the mobile 330 may request certain type of quality of service to be applied to a given flow.

Quality of service is often represented by a Flow Spec, which is commonly a collection of primitives related to QoS (e.g., minimum bandwidth, maximum delay tolerance, and so forth) and a Filter Spec, which is commonly a collection of packet classification criteria (e.g., source address, destination address, port numbers etc).

According to an aspect the NetLMM may react according to the following example rules or policies:

On a Link Up trigger the access router (AR) registers the link to the LMA.

On a Link Down trigger the AR deregisters the link from the LMA.

When multiple links are concurrently registered for the same mobile at the LMA 310, they are processed as alternative links. The LMA 310 in this case can apply default/optional forwarding policy which may involve sending some flows over one link and some flows over another link (flow/packet-splitting) or the LMA sends a copy of the traffic to all available links (X-casting) or other policy that is defined.

When a specific QoS request is received on a link for a given flow, the AR performs a flow-specific registration to the LMA 310. The LMA then sends traffic matching said flow to that particular link.

If a QoS reservation for a given flow is deleted or expires, the AR performs a flow specific de-registration.

If QoS requests indicate whether the flow can be unicasted or x-casted, then an appropriate registration can be performed, otherwise the LMA 310 can have local policy on how to treat flow specific requests over multiple links. Thus, if a flow is to be unicasted to a mobile, resources for that flow should be reserved on one link and should not on other links.

Quality of Service requests can include requests for best effort application. Best effort applications may still benefit from relative QoS.

If the link creation signaling identifies other existing links, a Context Transfer component can be used to move around QoS reservation descriptions (Flow Specs and/or Filter Specs) which can some times be verbose. In this case, a handle can be used to refer to such reservations e.g., a Service Class ID, reservation Id, Flow Spec Id, Filter Spec Id or other suitable ID negotiated during reservation establishment. In this case, an entity, e.g., the mobile 330, that wants to move a reservation from link to another sends a QoS reservation with the appropriate ID to the new AR. The new AR at 320 then registers the corresponding flow to the LMA. Similar procedure can be followed for the release of the resources from the old AR for that flow. It is noted that although six access components are illustrated in the system 300 that more or less than six such components can be employed.

Figure 4:
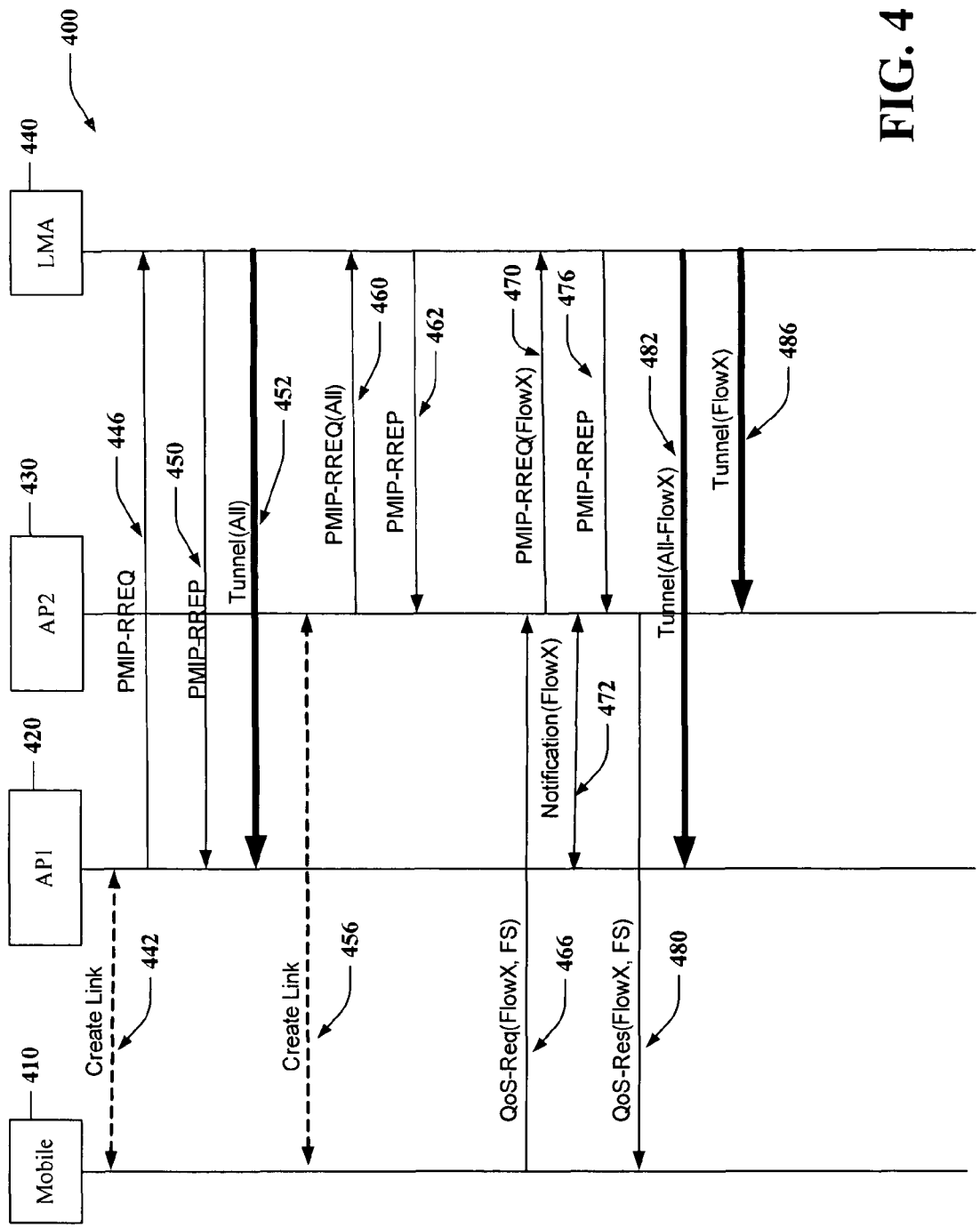
FIG. 4 is a message flow diagram for concurrent message support.

Turning to FIG. 4, an example message flow diagram 400 is illustrated. The message flow diagram 400 represents but one of a plurality of possible messaging scenarios. In this example, two concurrent links are established but it is to be appreciated that more than two links can be established with a respective mobile device 410. As shown, the mobile device 410 communicates through access points (AP) 420 and 430 to an LMA 440. A link creation message is sent from the mobile device to AP1 at 420. A PMIP request 446 is then transmitted from AP1 420 to the LMA 440. At 450, a PMIP response is sent from the LMA 440 to AP1 at 420. At 452, a tunnel is created between the LMA 440 and AP1 at 420. Since mobile device 410 has a single link, with AP1 420, Tunnel 452 carries the traffic for said mobile device 410. In a similar manner, an additional link is created at 456 between the mobile device 410 and AP2 at 430.

A PMIP request 460 is sent to the LMA 440 where a PMIP response 462 is received by the AP2 at 430. At 466, a QoS request is generated by the mobile device 410 and sent to AP2 at 430. The QoS request of 466 may identify a specific flow out of the plurality of flows currently used by mobile device 410 to which the requested QoS should apply. A PMIP request 470, including the definition of the specific flow in QoS request 466, is then sent to the LMA 440. At 472, notifications may be exchanged between AP1 420 and AP2 430 to inform AP1 420 of the redirection of a given flow via AP2 430. At 476, a PMIP response is sent to AP2 430. At 480, a QoS response is delivered to the mobile device 410. At 482 and 486, tunnels are created between the LMA 440 and AP1 420 and AP2 430, respectively. Tunnel 482 now carries all of the mobile device's 410 flows except of the one identified in QoS request 466. Tunnel 486 now carries the flows identified in QoS request 466

Figure 5:
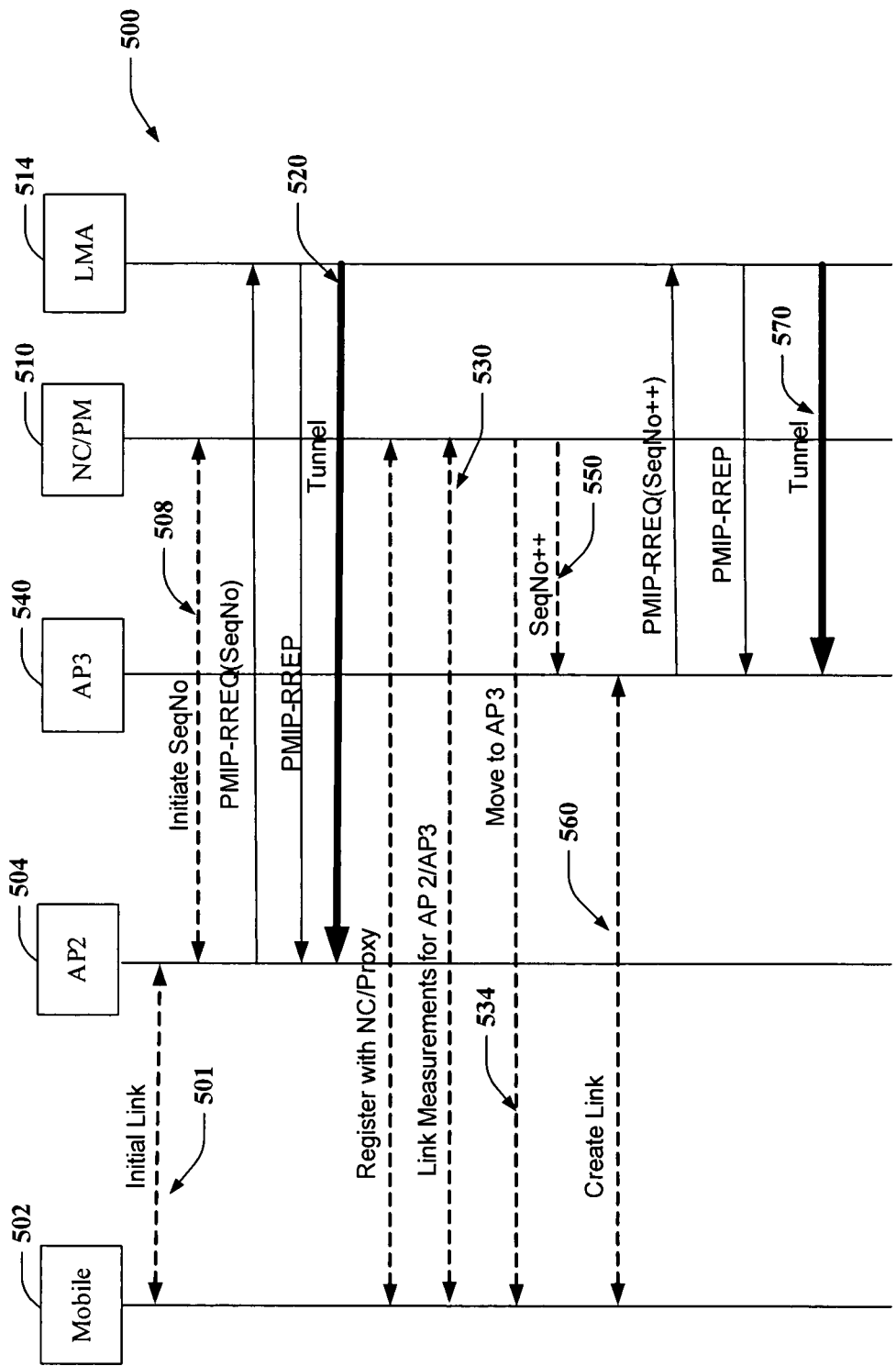
FIG. 5 is a message flow diagram that illustrates example messages and registrations.

Referring to FIG. 5, a message flow diagram 500 illustrates example messages and registrations depicted in FIG. 4. In the diagram 500, dashed lines represent optional messages that can be provided in various ways. A Mobile 502 creates an initial link 501 with AP2 504. Then, AP2 504 initiates a Sequence Number 508 with a Network Controller (NC)/Proxy Mobile (PM) 510. It is noted that the NC and PM at 510 may be collocated or may be independent but communicating processes. AP2 504 uses the Sequence Number 508 provided by NC/PM 510 to perform a PMIP registration with an LMA 514. The LMA 514 forms a tunnel now at 520 for the mobile points to AP2 504.

The Mobile 502 sends link measurement reports at 530 (e.g., SNR reports) to the NC/PM 510. The NC/PM 510 makes a decision that AP3 at 540 is a better access point for the Mobile 502 and sends a command at 534 to the mobile 502 to instruct it to move to AP3 540. The NC/PM 510 also sends a new Sequence Number 550 to AP3 540. The mobile 502 creates a link 560 to AP3 540 and the AP3 performs a {PMIP registration this time with the new Sequence number. A tunnel 570 now points to AP3 540 for that mobile 502. The Sequence Number can be a number or a timestamp or other incrementing ID. A PMIP protocol is used as an example implementation of NetLMM, where NetLMM may be implemented with other message types between an access router (also called a MAG) and the LMA 514. Another variant of this message exchange is that instead of PMIP, regular MIP can be used with the NC/PM node 510 providing a Mobile IP client and the LMA providing a Mobile IP Home Agent. The APs may optionally be Mobile IP Foreign agents, if desired.

Figure 6:
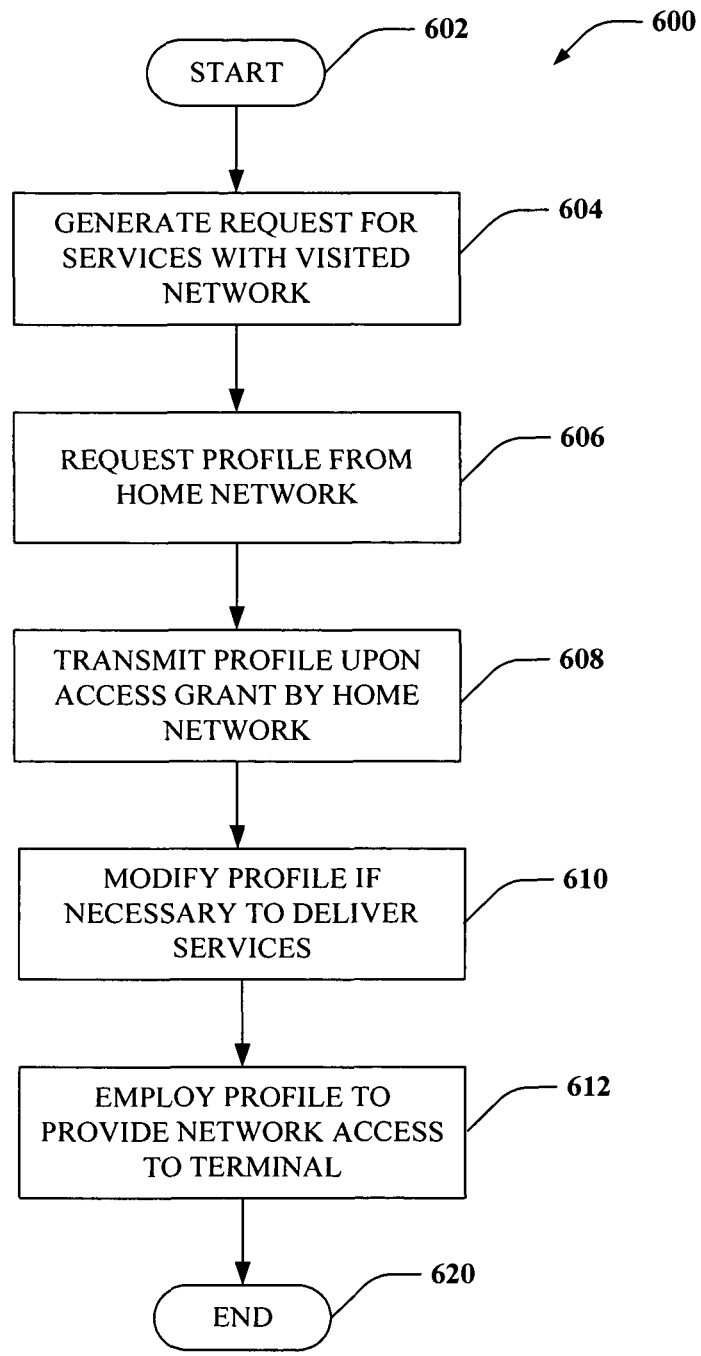
FIG. 6 illustrates an example sequence process for ordering messages.

Referring to FIG. 6, a methodology 600 relating to message ordering and registration is illustrated. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 602, the process 600 begins where an initial registration is performed at 604 when a mobile device communicates via an access node to a domain node such as a local mobility anchor (LMA). At 606, in accordance with the registration, a sequence number is generated by the device that will be employed for communications with during communications with the respective access node registered at 604. At 608, when the mobile device moves out of range of the previous access point and into range of another access point, a subsequent registration is performed with the LMA through the new access point. At 610, a new sequence number is assigned for the subsequent registration at 608 by the mobile device. As noted above, the sequence numbers can take the form of incremental data, decremented data, or time stamp data for example. Also, if yet another access point is encountered, yet another registration can be performed along with generation of yet another sequence number.

At 612, the mobile device employs the respective sequence number when communicating with a given access point. For instance, if sequence number 1 is generated when registering to access point 1, then sequence number 1 is employed as part of the messaging protocol for future communications through access point 1. Similarly, if sequence number 2 is generated when registering through access point 2, then sequence number 2 is employed by the mobile device as part of its messaging protocol for further communications through access point 2. In this manner, message ordering can be achieved and effects such as node ping-pong are mitigated. As can be appreciated, more than two nodes can be registered having additional sequence numbers as may be necessary for the additional access points.

Figure 7:
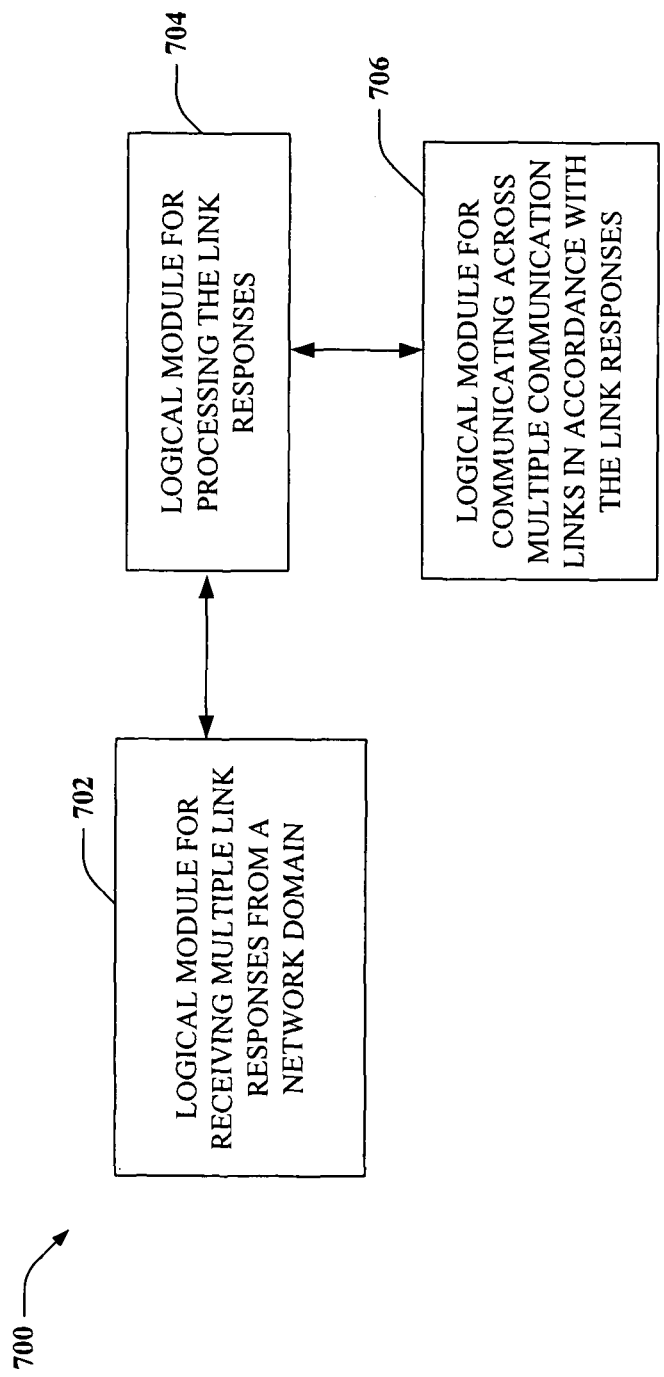
FIGS. 7 and 8 illustrate example logical modules for processing messages and registrations.
Figure 8:
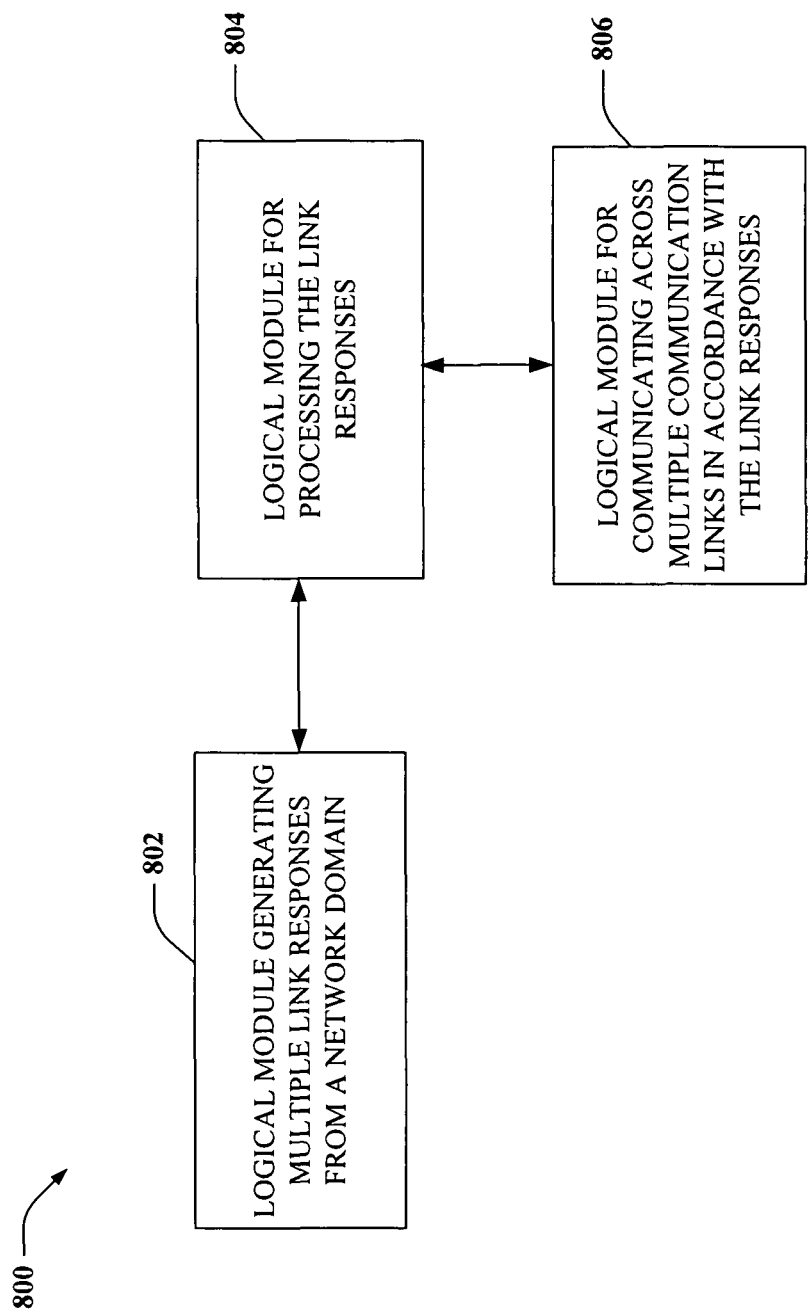

Turning now to FIGS. 7 and 8 collectively, systems are provided that relate to sequence ordering with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 7, a system 700 that facilitates communications between a mobile device and multiple communications links. The system 700 includes a logical module 710 for receiving multiple link responses from a network domain and a logical module 720 for processing the link responses. The system 700 also includes a logical module 730 for communicating across multiple communication links in accordance with the link responses.

Now referring to FIG. 8, a system 800 that facilitates communications from a network domain. The system 800 includes a logical module 810 for generating multiple link responses from a network domain and a logical module 820 for processing the link responses. The system 800 also includes a logical module 830 for communicating across multiple communication links in accordance with the link responses.

Figure 9:
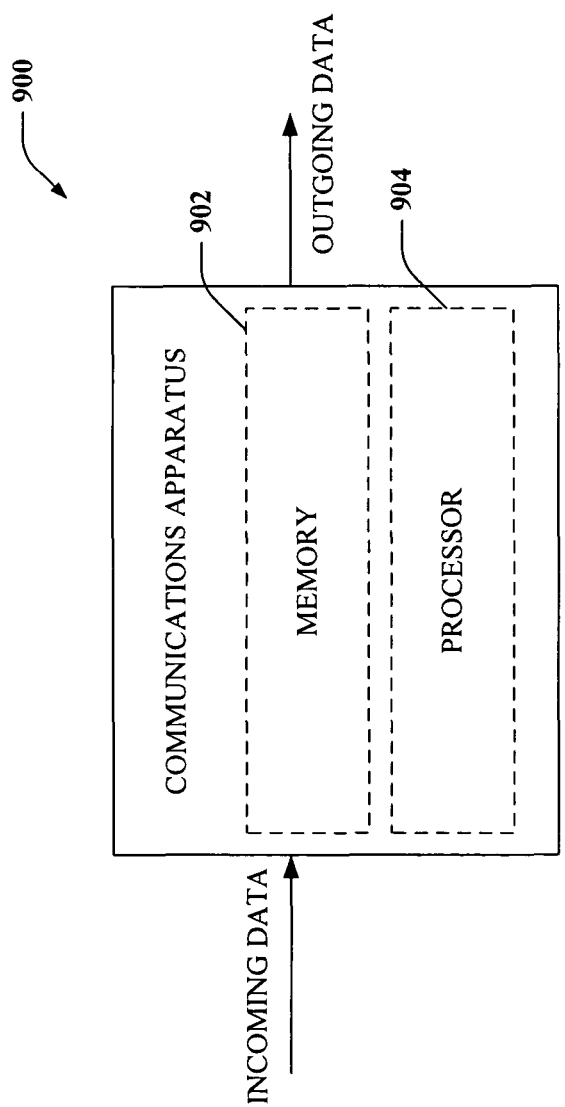
FIG. 9 illustrates an example communications apparatus that communicates over multiple communications links.
Figure 10:
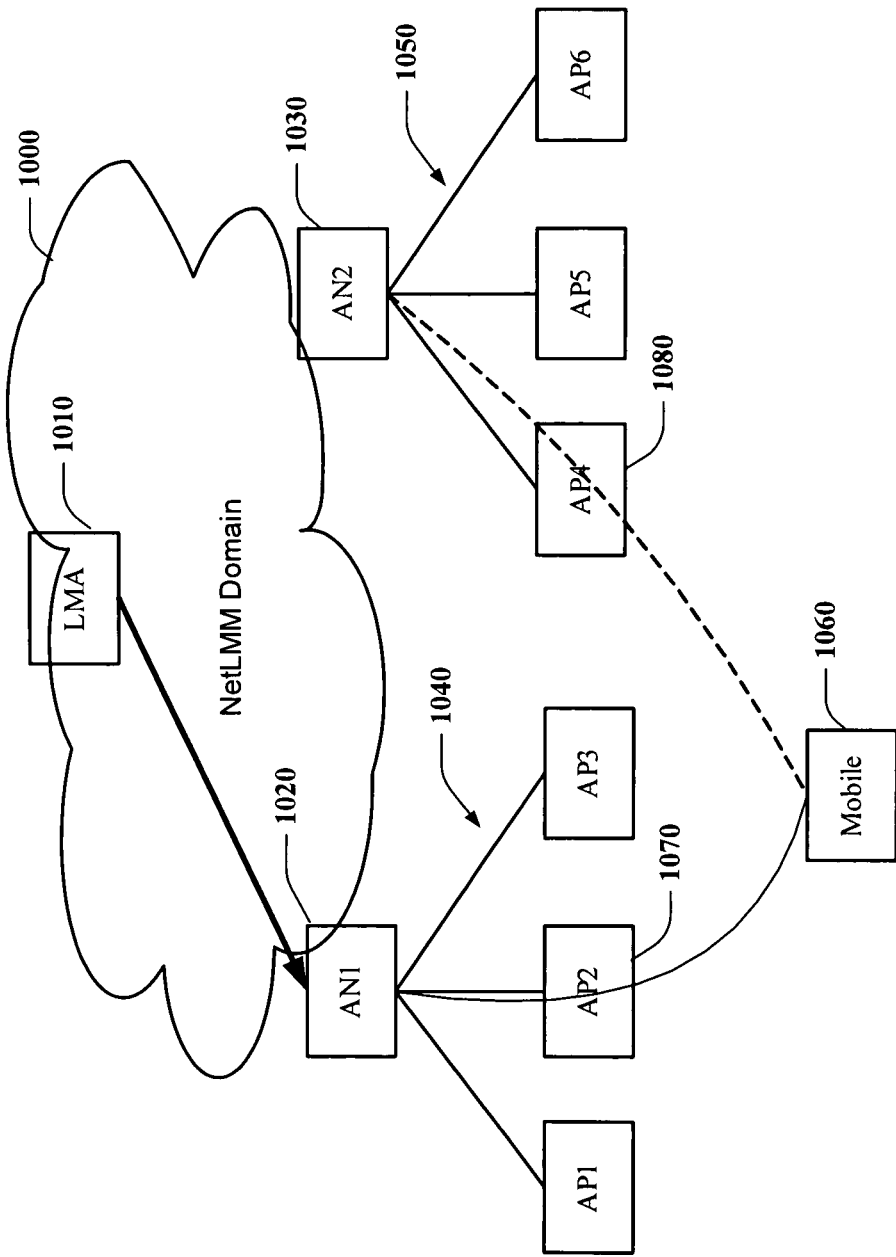
FIG. 10 illustrates a prior art network based mobility management system.

FIG. 9 illustrates a communications apparatus 900 that can be a wireless communications apparatus, for instance, such as a wireless terminal. Additionally or alternatively, communications apparatus 900 can be resident within a wired network. Communications apparatus 900 can include memory 902 that can retain instructions for configuring such apparatus with respect to QoS data and sequence data for a terminal (and traffic flows associated therewith). Additionally, communications apparatus 900 may include a processor 904 that can execute instructions within memory 902 and/or instructions received from another network device, wherein the instructions can relate to configuring communications apparatus 900 or a related communications apparatus.

The memory 902 retains instructions for receiving a profile associated with one or more services, where the profile can be associated with a home network component and modifiable via a visited network component, the profile employed to offer services to a roaming access terminal. In another aspect, the memory retains instructions for generating a profile associated with one or more services, where the profile can be associated with a home network component and modifiable via a services description component. The profile can be employed to offer services to a roaming access terminal, for example.

Figure 11:
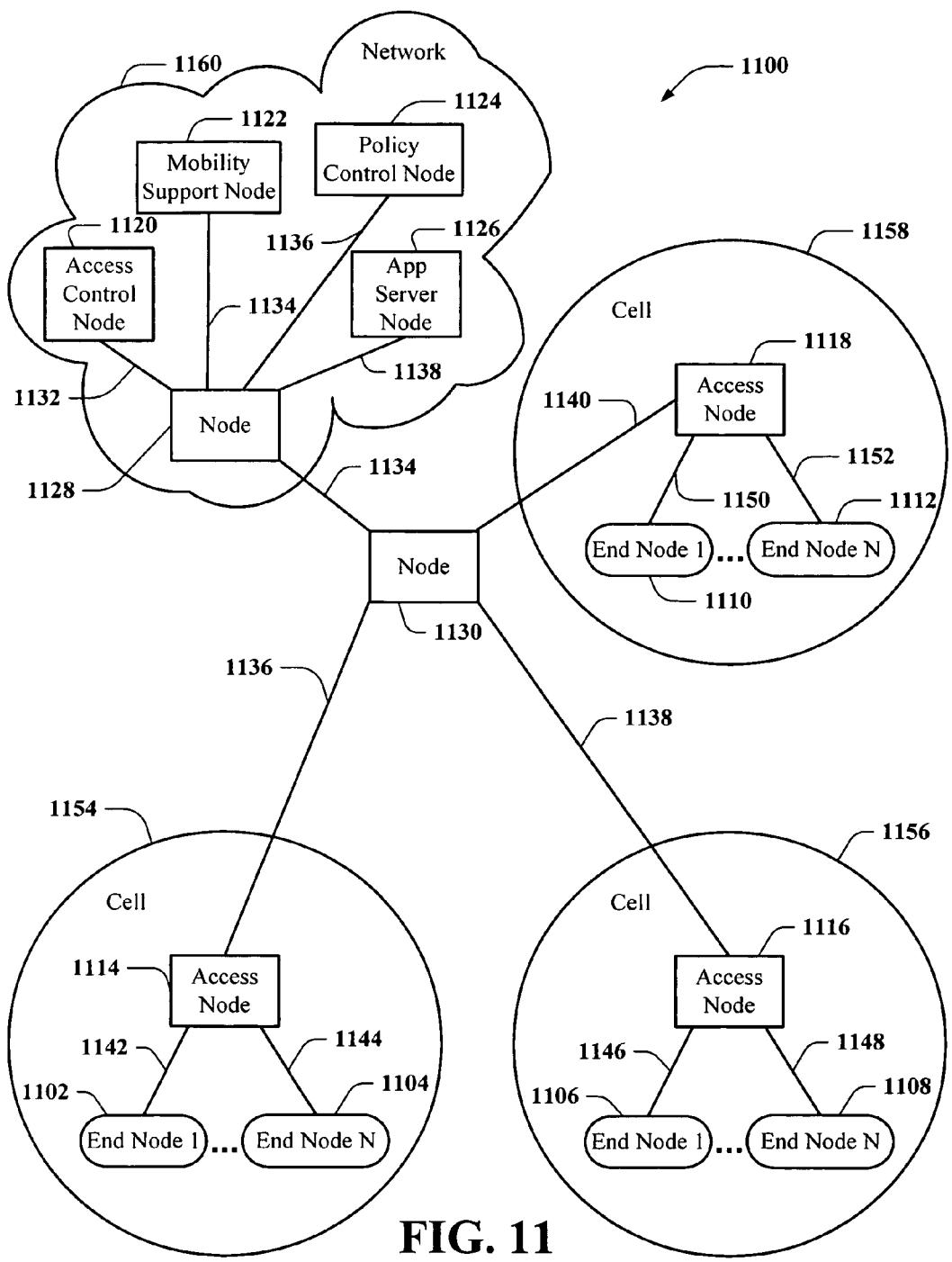
FIG. 11 illustrates an example communications system.

To provide additional context for one or more embodiments described herein, FIG. 11 is provided to illustrate an example communication system 1100 that comprises a plurality of nodes interconnected by communications links. The system 1100 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1100 exchange information using signals, e.g., messages, based on communication protocols, e.g., the Internet Protocol (IP). The communications links of the system 1100 may be implemented, for example, using wires, fiber optic cables, and/or wireless communications techniques. The system 1100 includes a plurality of end nodes 1102-1112, which access the communication system 1100 by way of a plurality of access nodes 1114-1118. End nodes 1102-1112 may be, e.g., wireless communication devices or terminals, and the access nodes 1114-1118 may be, e.g., wireless access routers or base stations. Communication system 1100 also includes a number of other nodes 1120-1130 that are used to provide interconnectivity or to provide specific services or functions.

Communications system 1100 depicts a network 1160 that includes access control node 1120, mobility support node 1122, policy control node 1124, and application server node 1126, all of which are connected to an intermediate network node 1128 by a corresponding network link 1132-1138, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 1122, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 1124, e.g., a policy server or Policy Decision Point (PDP), supports policy authorization for services or application layer sessions. In some embodiments, application server node 1126, e.g., a Session Initiation Protocol server, streaming media server, or other application layer server, supports session signaling for services available to end nodes and/or provides services or content available to end nodes.

Intermediate network node 1128 in network 1160 provides interconnectivity to network nodes that are external from the perspective of network 1160 by way of network link 1134. Network link 1134 is connected to intermediate network node 1130, which provides further connectivity to access nodes 1114, 1116, and 1118 by way of network links 1136-1140, respectively. Each access node 1114-1118 is depicted as providing connectivity to end nodes 1102-1112, respectively, by way of corresponding access links 1142-1152, respectively. In communication system 1100, each access node 1114-1118 is depicted as using wireless technology, e.g., wireless access links, to provide access. Wired technology may also be utilized, however, in connection with provision of access. A radio coverage area, e.g., communications cells 1154-1158 of each access node 1114-1118, is illustrated as a circle surrounding the corresponding access node.

Communication system 1100 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1100. Additionally, some of the functional entities depicted in communication system 1100 may be omitted or combined. Location or placement of these functional entities may also be varied.

Figure 12:
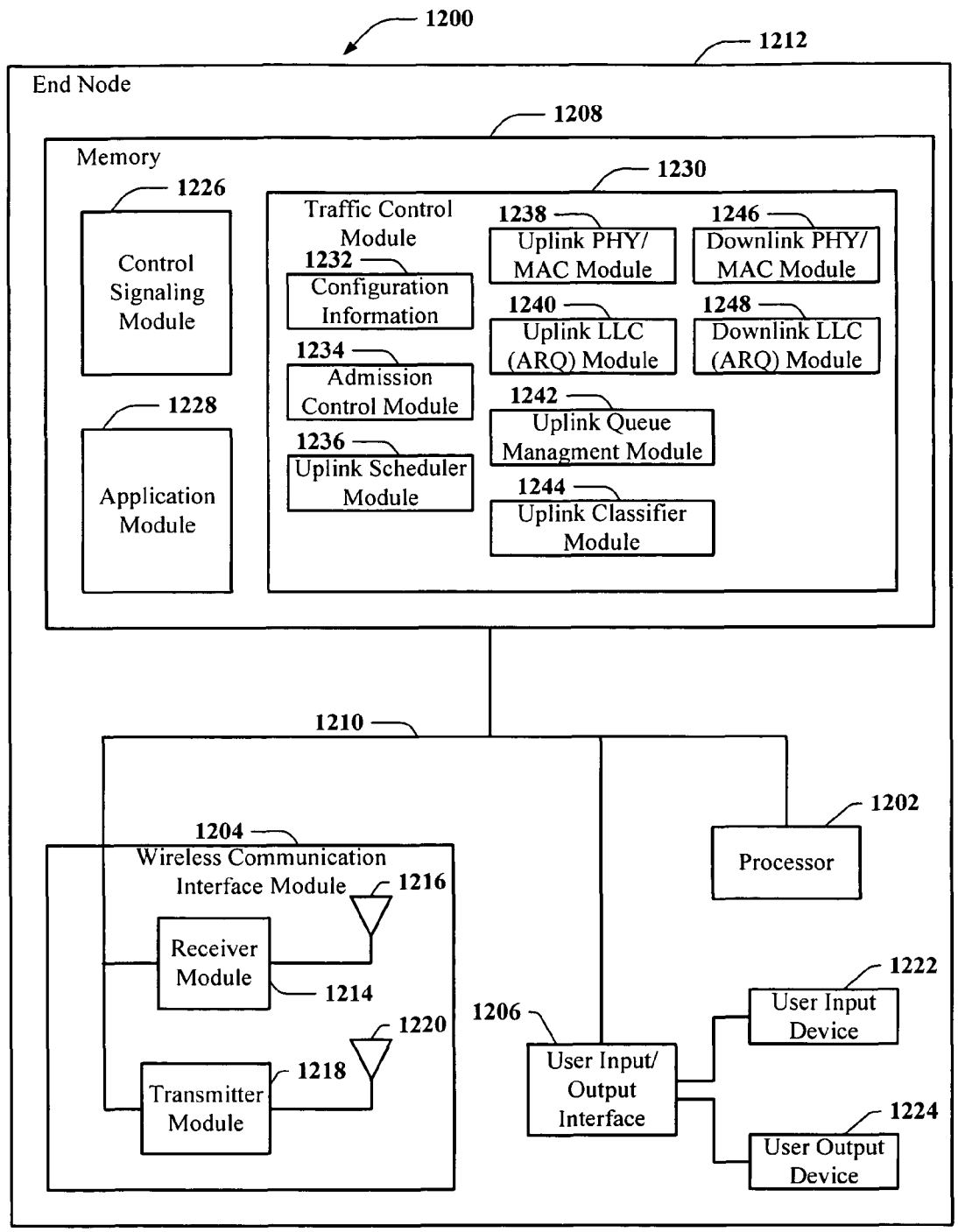
FIG. 12 illustrates an example end node.

FIG. 12 provides an illustration of an example end node 1200, e.g., wireless terminal. End node 1200 is a representation of an apparatus that may be used as any one of end nodes 1102-1112 (FIG. 11). End node 1200 includes a processor 1202, a wireless communication interface module 1204, a user input/output interface 1206 and memory 1208 coupled together by a bus 1210. Accordingly, by way of bus 1210, the various components of the end node 1200 can exchange information, signals and data. Components 1202-1208 of end node 1200 can be located inside a housing 1212.

Wireless communication interface module 1204 provides a mechanism by which the internal components of end node 1200 can send and receive signals to/from external devices and network nodes, e.g., access nodes. Wireless communication interface module 1204 includes, e.g., a receiver module 1214 with a corresponding receiving antenna 1216 and a transmitter module 1218 with a corresponding transmitting antenna 1220 used for coupling end node 1200 to other network nodes, e.g., by way of wireless communications channels.

End node 1200 also includes a user input device 1222, e.g., keypad, and a user output device 1224, e.g., display, which are coupled to bus 1210 through user input/output interface 1206. Thus, user input/output devices 1222 and 1224 can exchange information, signals and data with other components of end node 1200 by way of user input/output interface 1206 and bus 1210. User input/output interface 1206 and associated devices 1222 and 1224 provide mechanisms by which a user can operate end node 1200 to accomplish various tasks. In particular, user input device 1222 and user output device 1224 provide functionality that allows a user to control end node 1200 and applications, e.g., modules, programs, routines and/ or functions, that execute in memory 1208 of end node 1200.

Processor 1202, under control of various modules, e.g., routines, included in memory 1208 controls operation of end node 1200 to perform various signaling and processing. The modules included in memory 1208 are executed on startup or as called by other modules. Modules may exchange data, information, and signals when executed. Modules may also share data and information when executed. Memory 1208 of end node 1200 includes a control signaling module 1226, an application module 1228, and a traffic control module 1230, which further includes configuration information 1232 and various additional modules.

Control signaling module 1226 controls processing relating to receiving and sending signals, e.g., messages, for controlling operation and/or configuration of various aspects of end node 1200 including, e.g., traffic control module 1230 as well as configuration information 1232 and various additional modules included. In some embodiments, control signaling module 1226 can include state information, e.g., parameters, status and/or other information, relating to operation of end node 1200 and/or one or more signaling protocols supported by control signaling module 1226. In particular, control signaling module 1226 may include configuration information, e.g., end node identification information and/or parameter settings, and operational information, e.g., information about current processing state, status of pending message transactions, etc.

Application module 1228 controls processing and communications relating to one or more applications supported by end node 1200. In some embodiments, application module 1228 processing can include tasks relating to input/output of information by way of the user input/output interface 1206, manipulation of information associated with an application, and/or receiving or sending signals, e.g., messages, associated with an application. In some embodiments, application module 1228 includes state information, e.g., parameters, status and/or other information, relating to operation of one or more applications supported by application module 1228. In particular, application module 1228 may include configuration information, e.g., user identification information and/or parameter settings, and operational information, e.g., information about current processing state, status of pending responses, etc. Applications supported by application module 1228 include, e.g., Voice over IP (VoIP), web browsing, streaming audio/video, instant messaging, file sharing, gaming, etc.

Traffic control module 1230 controls processing relating to receiving and sending data information, e.g., messages, packets, and/or frames, through wireless communication interface module 1204. The example traffic control module 1230 includes configuration information 1232 as well as various additional modules that control various aspects of QoS for packets and/or traffic flows, e.g., associated sequences of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 1230 follows.

An admission control module 1234 maintains information relating to resource utilization/availability and determines if sufficient resources are available to support QoS parameters desirably associated with particular traffic flows. Resource availability information maintained by admission control module 1234 includes, e.g., packet and/or frame queuing capacity, scheduling capacity, as well as processing and memory capacity needed to support one or more traffic flows. Control signaling module 1226, application module 1228, and/or other modules included in end node 1200 may query admission control module 1234 to determine if sufficient resources are available to support a new or modified traffic flow, where the admission control determination is a function of QoS parameters of the particular traffic flow and QoS parameters defined within a profile. Configuration information 1232 can include configuration information, e.g., parameters settings, that affect the operation of admission control module 1234, e.g., an admission control threshold value that indicates percentage of resource that may be allocated prior to rejecting additional requests.

An uplink scheduler module 1236 controls processing relating to transmission scheduling, e.g., order and/or timing, and allocation of transmission resources, e.g., information coding rate, transmission time slots, and/or transmission power, for data information, e.g., messages, packets, and/or frames, to be sent by way of wireless communication interface module 1204, e.g., from end node 1200 to an access node. Uplink scheduler module 1236 can schedule transmissions and allocate transmission resources as a function of QoS parameters associated with one or more traffic flows. In some embodiments, scheduling and/or resource allocation operations performed by uplink scheduler module 1236 are additionally a function of channel conditions and other factors, e.g., power budget.

An uplink PHY/MAC module 1238 controls physical (PHY) layer and Media Access Control (MAC) layer processing relating to sending data information, e.g., messages, packets, and/or frames, by way of wireless communication interface module 1204, e.g., from end node 1200 to an access node. For instance, operation of uplink PHY/MAC module 1238 includes both sending and receiving control information, e.g., signals or messages, to coordinate sending of data information, e.g., messages, packets, and/or frames. Configuration information 1232 can include configuration information, e.g., parameters settings, that affect the operation of uplink PHY/MAC module 1238, e.g., a frequency, band, channel, spreading code or hoping code to be used for transmissions, an identifier associated with end node 1200, a request dictionary prescribing use of an assignment request channel, etc.

An uplink LLC (ARQ) module 1240 controls Logical Link Control (LLC) layer processing relating to sending data information, e.g., messages, packets, and/or frames, through wireless communication interface module 1204, e.g., from end node 1200 to an access node. Uplink LLC (ARQ) module 1240 includes processing associated with Automatic Repeat Request (ARQ) capabilities, e.g., retransmission of lost packets or frames. Uplink LLC (ARQ) module 1240 can, for instance, further include processing relating to addition of an LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 1240 can additionally perform fragmentation of higher layer messages, e.g., packets, into multiple sub-portions, e.g., frames to be sent by uplink PHY/MAC module 1240. Configuration information 1232 can include configuration information that affect operation of uplink LLC (ARQ) module 1240, e.g., an ARQ window size, maximum number of retransmissions, a discard timer, etc.

An uplink queue management module 1242 maintains information and controls processing relating to storage of data information to be sent by way of wireless communication interface module 1204, e.g., from end node 1200 to an access node. Uplink queue management module 1242 can, for example, control storage of data information awaiting transmission and maintain state information regarding data information awaiting transmission on a per traffic flow basis, e.g., packets associated with each traffic flow may be stored in separate queues. For instance, uplink queue management module 1242 supports a variety of queue management techniques and/or capabilities, e.g., head drop, tail drop, as well as various Active Queue Management (AQM) mechanisms such as Random Early Detection (RED). Configuration information 1232 can include configuration information that affects operation of uplink queue management module 1242, such as a queue limit, drop strategy, and/or AQM thresholds associated with one or more traffic flows.

An uplink classifier module 1244 controls processing relating to identification of data information as belonging to particular traffic flows prior to being sent by way of the wireless communication interface module 1204, e.g., from end node 1200 to an access node. In some embodiments, messages, packets, and/or frames to be sent through utilization of wireless communication interface module 1204 are classified as belonging to one of a variety of traffic flows by uplink classifier module 1244 based on inspection of one or more header and/or payload fields. Results of classification by uplink classifier module 1244 can affect the treatment of classified data information by uplink queue management module 1242 as well as other modules within memory 1208. For example, the results may determine a particular queue the message, packet, and/or frame will be associated with for storage and further affect subsequent processing such as scheduling. Configuration information can include configuration information that affect operation of uplink classifier module 1244, e.g., a set of one or more classifier filter rules that prescribe criteria used to associate data information, e.g., messages, packets, and/or frames, as belonging to one or more traffic flows.

A downlink PHY/MAC module 1246 controls PHY layer and MAC layer processing relating to receiving data information by way of wireless communication interface module 1204. Operation of downlink PHY/MAC module 1246 can include both sending and receiving control information to coordinate receiving of data information. Configuration information 1204 can include configuration information that affect operation of downlink PHY/MAC module 1246, e.g., a frequency, band, channel, spreading code or hoping code to be used for reception, an identifier associated with end node 1200, etc.

A downlink LLC (ARQ) module 1248 controls LLC layer processing relating to receiving data information by way of wireless communication interface module 1204. Downlink LLC (ARQ) module 1248 includes processing associated with ARQ capabilities, e.g., retransmission of lost packets or frames. For example, downlink LLC (ARQ) module 1248 can further include processing relating to an LLC header and/or trailer that encapsulates higher layer messages, which provides additional functionality, e.g., multi-protocol multiplexing/demultiplexing through a type field or error detection by way of a checksum field. Downlink LLC (ARQ) module 1248 can also perform reassembly of frames received by the downlink PHY/MAC module 1246 into higher layer messages. Configuration information 1232 can, and in some embodiments does, include configuration information, e.g., parameters settings, that affect operation of downlink LLC (ARQ) module 1248, e.g., an ARQ window size, maximum number of retransmissions, a discard timer, etc.

Figure 13:
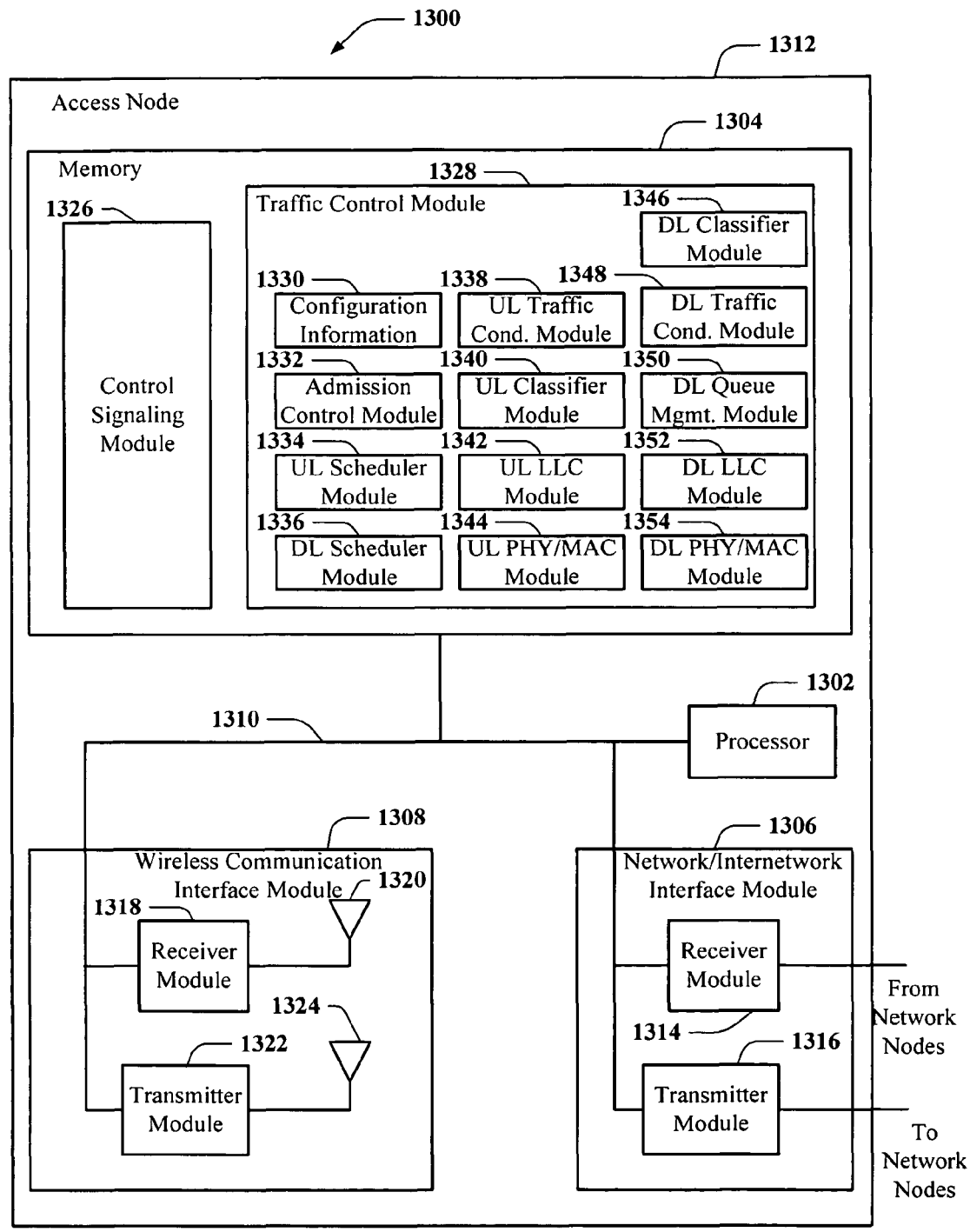
FIG. 13 illustrates an example access node.

FIG. 13 provides a detailed illustration of an example access node 1300 implemented in accordance with the present invention. The access node 1300 is a detailed representation of an apparatus that may be used as any one of the access nodes 1114-1118 depicted in FIG. 11. In the FIG. 13 embodiment, access node 1300 includes a processor 1302, memory 1304, a network/internetwork interface module 1306 and a wireless communication interface module 1308, coupled together by bus 1310. Accordingly, by way of bus 1310 the various components of access node 1300 can exchange information, signals and data. The components 1302-1310 of access node 1300 are located inside a housing 1312.

Network/internetwork interface module 1306 provides a mechanism by which the internal components of access node 1300 can send and receive signals to/from external devices and network nodes. Network/internetwork interface module 1306 includes a receiver module 1314 and a transmitter module 1316 used for coupling node 1300 to other network nodes, e.g., through copper wires or fiber optic lines. Wireless communication interface module 1308 also provides a mechanism by which the internal components of access node 1300 can send and receive signals to/from external devices and network nodes, e.g., end nodes. Wireless communication interface module 1308 includes, e.g., a receiver module 1318 with a corresponding receiving antenna 1320 and a transmitter module 1322 with a corresponding transmitting antenna 1324. Wireless communication interface module 1308 is used for coupling access node 1300 to other nodes, e.g., by way of wireless communication channels.

Processor 1302 under control of various modules, e.g., routines, included in memory 1304 controls operation of access node 1300 to perform various signaling and processing. The modules included in memory 1304 are executed on startup or as called by other modules. Modules may exchange data, information, and signals when executed. Modules may also share data and information when executed. In the FIG. 13 embodiment, memory 1304 of access node 1300 includes a control signaling module 1326 and a traffic control module 1328, which further includes configuration information 1330 and various additional modules 1332-1354.

Control signaling module 1326 controls processing relating to receiving and sending signals, e.g., messages, for controlling operation and/or configuration of various aspects of access node 1300 including, e.g., traffic control module 1328 as well as configuration information 1330 and the various additional modules included therein 1332-1354. For instance, control signaling module 1326 includes state information, e.g., parameters, status and/or other information, relating to operation of access node 1300 and/or one or more signaling protocols supported by control signaling module 1326. In particular, control signaling module 1326 may include configuration information, e.g., access node identification information and/or parameter settings, and operational information, e.g., information about current processing state, status of pending message transactions, etc.

Traffic control module 1328 controls processing relating to receiving and sending data information, e.g., messages, packets, and/or frames, by way of wireless communication interface module 1308. For instance, traffic control module can include configuration information 1330 as well as various additional modules 1332-1354 that control various aspects of quality of service for packets and/or traffic flows, e.g., associated sequences of packets. In some embodiments, traffic control module 1328 includes state information, e.g., parameters, status and/or other information, relating to operation of access node 1300, traffic control module 1328, and/or one or more of the various additional modules included therein 1332-1354. Configuration information 1330, e.g., parameter settings, determines, affects and/or prescribes operation of traffic control module 1328 and/or the various additional modules included therein 1332-1354. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 1328 follows.

Admission control module 1332 maintains information relating to resource utilization/availability and determines if sufficient resources are available to support quality of service requirements of particular traffic flows. Resource availability information maintained by admission control module 1332 includes, e.g., packet and/or frame queuing capacity, scheduling capacity, as well as processing and memory capacity needed to support one or more traffic flows. Control signaling module 1326 and/or other modules included in access node 1300 can query admission control module 1332 to determine if sufficient resources are available to support a new or modified traffic flow, where the admission control determination is a function of the quality of service requirements of the particular traffic flow and/or the available resources. Configuration information 1330 can include configuration information, e.g., parameters settings, that affect the operation of admission control module 1332, e.g., an admission control threshold value that indicates the percentage of resource that may be allocated prior to rejecting additional requests.

Uplink scheduler module 1334 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node by way of wireless interface module 1308. Uplink scheduler module 1334 can schedule transmissions and allocate transmission resources as a function of the quality of service requirements and/or constraints associated with one or more traffic flows and/or one or more end nodes. Configuration information 1330 can include configuration information that affect the operation of uplink scheduler module 1334, e.g., a priority, rate bound, latency bound, and/or sharing weight associated with one or more traffic flows and/or end nodes. In some embodiments, scheduling and/or resource allocation operations performed by uplink scheduler module 1334 are additionally a function of channel conditions and other factors, e.g., power budget.

Downlink scheduler module 1336 controls processing relating to transmission scheduling, e.g., order and/or timing, and allocation of transmission resources, e.g., information coding rate, transmission time slots, and/or transmission power, for data information, e.g., messages, packets, and/or frames, to be sent from access node 1300 to one or more end nodes through wireless interface module 1308. Downlink scheduler module 1336 can schedule transmissions and allocate transmission resources as a function of the quality of service requirements and/or constraints associated with one or more traffic flows and/or one or more end nodes. Configuration information 1330 can include configuration information that affects the operation of downlink scheduler module 1336, e.g., a priority, rate bound, latency bound, and/or sharing weight associated with one or more traffic flows and/or end nodes. In some embodiments, scheduling and/or resource allocation operations performed by the downlink scheduler module 1336 are additionally a function of channel conditions and other factors, e.g., power budget.

Uplink traffic conditioner module 1338 controls processing relating to traffic conditioning, e.g., metering, marking, policing, etc., for data information, e.g., messages, packets, and/or frames, received by way of wireless interface module 1308, e.g., from an end node to access node 1300. Uplink traffic conditioner module 1338 can condition traffic, e.g., meter, mark and/or police, as a function of the quality of service requirements and/or constraints associated with one or more traffic flows and/or one or more end nodes. Configuration information 1330 can include configuration information that affects the operation of uplink traffic conditioner module 1338, e.g., a rate bound, and/or marking value associated with one or more traffic flows and/or end nodes.

Uplink classifier module 1340 controls processing relating to identification of data information, e.g., messages, packets, and/or frames, received through wireless interface module 1308, e.g., from an end node to access node 1300, as belonging to particular traffic flows prior to being processed by uplink traffic conditioner module 1338. In some embodiments, messages, packets, and/or frames received through wireless communication interface module 1308 are classified as belonging to one of a variety of traffic flows by uplink classifier module 1340 based on inspection of one or more header and/or payload fields. The results of classification by uplink classifier module 1340 can affect the treatment of the classified data information, e.g., messages, packets, and/or frames, by uplink traffic conditioner module 1338, e.g., the results may determine a particular data structure or state machine the message, packet, and/or frame will be associated with and further affect subsequent processing such as metering, marking, and/or policing. Configuration information 1330 can include configuration information that affects the operation of uplink classifier module 1340, e.g., a set of one or more classifier filter rules that prescribe criteria used to associate data information, e.g., messages, packets, and/or frames, as belonging to one or more traffic flows.

Uplink LLC (ARQ) module 1342 controls LLC layer processing relating to receiving data information, e.g., packets and/or frames, by way of wireless communication interface module 1308, e.g., from an end node to access node 1300. Uplink LLC (ARQ) module 1342 includes processing associated with ARQ capabilities, e.g., retransmission of lost packets or frames. In some embodiments, uplink LLC (ARQ) module 1342 further includes processing relating to an LLC header and/or trailer that encapsulates higher layer messages, e.g., packets, which provides additional functionality, e.g., multi-protocol multiplexing/demultiplexing through a type field or error detection by way of a checksum field. Uplink LLC (ARQ) module 1342 can also perform reassembly of frames received by uplink PHY/MAC module 1344 into higher layer messages, e.g., packets. The configuration information 1330 can include configuration information that affects the operation of uplink LLC (ARQ) module 1342, e.g., an ARQ window size, maximum number of retransmissions, a discard timer, etc.

Uplink PHY/MAC module 1344 controls PHY layer and MAC layer processing relating to receiving data information, e.g., packets and/or frames, by way of wireless communication interface module 1308, e.g., from an end node to access node 1300. In some embodiments, operation of uplink PHY/MAC module 1344 includes both sending and receiving control information, e.g., signals or messages, to coordinate receiving of data information, e.g., messages, packets, or frames. Configuration information 1330 can include configuration information that affects the operation of uplink PHY/MAC module 1344, e.g., a frequency, band, channel, spreading code or hopping code to be used for reception, an identifier associated with access node 1300, etc.

Downlink classifier module 1346 controls processing relating to identification of data information, e.g., messages, packets, and/or frames, as belonging to particular traffic flows prior to being sent through wireless communication interface module 1308, e.g., from access node 1300 to an end node. In some embodiments, messages, packets, and/or frames to be sent by way of wireless communication interface module 1308 are classified as belonging to one of a variety of traffic flows by downlink classifier module 1346 based on inspection of one or more header and/or payload fields. The results of classification by downlink classifier module 1346 can affect the treatment of the classified data information, e.g., messages, packets, and/or frames, by downlink queue management module 1350 and other modules 1348, 1352, and 1354, e.g., the results may determine a particular queue the message, packet, and/or frame will be associated with for storage and further affect subsequent processing such as scheduling. Configuration information 1330 can include configuration information, e.g., parameters settings, that affect the operation of downlink classifier module 1346, e.g., a set of one or more classifier filter rules that prescribe criteria used to associate data information, e.g., messages, packets, and/or frames, as belonging to one or more traffic flows.

Downlink traffic conditioner module 1348 controls processing relating to traffic conditioning, e.g., metering, marking, policing, etc., for data information, e.g., messages, packets, and/or frames, to be sent by way of wireless interface module 1308, e.g., from access node 1300 to an end node. Downlink traffic conditioner module 1348 can condition traffic, e.g., meter, mark and/or police, as a function of the quality of service requirements and/or constraints associated with one or more traffic flows and/or one or more end nodes. Configuration information 1330 can include configuration information that affects the operation of downlink traffic conditioner module 1348, e.g., a rate bound, and/or marking value associated with one or more traffic flows and/or end nodes.

Downlink queue management module 1350 maintains information and controls processing relating to storage of data information, e.g., messages, packets, and/or frames, to be sent by way of wireless communication interface module 1308, e.g., from access node 1300 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 1350 supports a variety of queue management techniques and/or capabilities, e.g., head drop, tail drop, as well as various AQM mechanisms such as RED. Configuration information 1330 can include configuration information that affects the operation of downlink queue management module 1350, e.g., a queue limit, drop strategy, and/or AQM thresholds associated with one or more traffic flows.

Downlink LLC (ARQ) module 1352 controls LLC layer processing relating to sending data information, e.g., messages, packets, and/or frames, by way of wireless communication interface module 1308, e.g., from access node 1300 to an end node. Downlink LLC (ARQ) module 1352 includes processing associated with ARQ capabilities, e.g., retransmission of lost packets or frames. In some embodiments, downlink LLC (ARQ) module 1352 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 1352 can also perform fragmentation of higher layer messages, e.g., packets, into multiple sub-portions, e.g., frames to be sent by downlink PHY/MAC module 1354. Configuration information 1330 can include configuration information that affects the operation of downlink LLC (ARQ) module 1352, e.g., an ARQ window size, maximum number of retransmissions, a discard timer, etc.

Downlink PHY/MAC module 1354 controls PHY layer and MAC layer processing relating to sending data information, e.g., messages, packets, and/or frames, by way of wireless communication interface module 1308, e.g., from access node 1300 to an end node. In some embodiments, operation of downlink PHY/MAC module 1354 includes both sending and receiving control information, e.g., signals or messages, to coordinate sending of data information, e.g., messages, packets, or frames. Configuration information 1330 can include configuration information that affects the operation of downlink PHY/MAC module 1354, e.g., a frequency, band, channel, spreading code or hoping code to be used for transmissions, an identifier associated with the access node 1300, etc.

Figure 14:
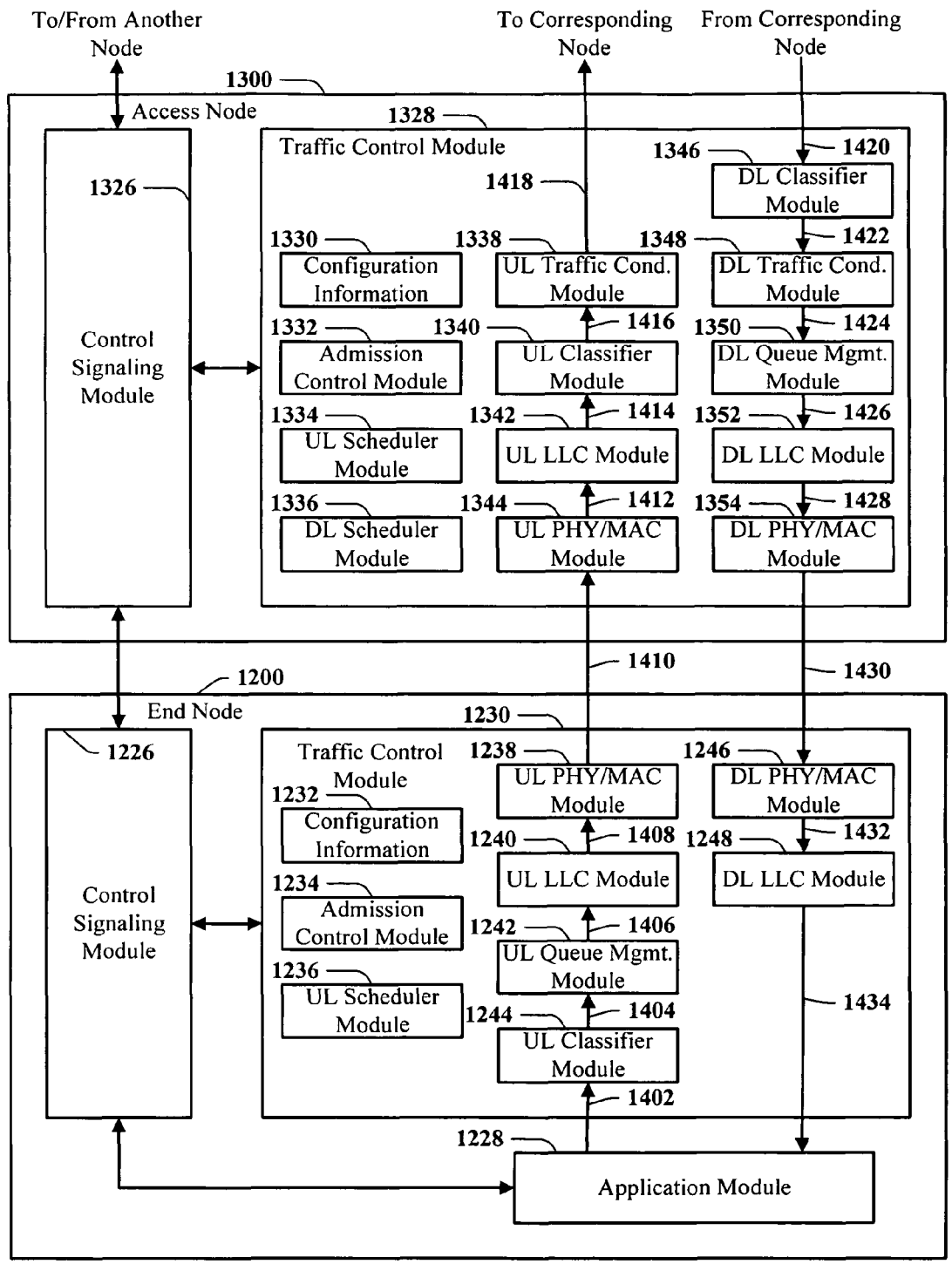
FIG. 14 illustrates an example end node communicating with an example access node.

FIG. 14 illustrates example signaling and traffic flows between various modules included in example end node 1200 and example access node 1300. The FIG. 14 end node 1200 and FIG. 14 access node 1300 are simplified representations of the FIG. 12 end node 1200 and FIG. 13 access node 1300, respectively. The FIG. 14 example shows application module 1228 sending and receiving data information, e.g., traffic flows comprising a sequence of messages, packets, or frames. In the context of the FIG. 11 example system, the FIG. 14 end node 1200 may be any one of end nodes 1102-1112 depicted in FIG. 11 and the application module 1228 included in the FIG. 14 end node 1200 may be exchanging data information with another node in the system, e.g., another end node 1102-1112 or the application server node 1126 as depicted in FIG. 11. In FIG. 14 and the subsequent description, the node with which the FIG. 14 end node 1200 is exchanging data information is referred to as the corresponding node.

The data information, e.g., traffic flows comprising a sequence of messages, packets, or frames, sent from the application module 1228 in the end node 1200 to a corresponding node is shown by a sequence of arrows 1402-1408 to proceed through a sequence of modules 1238-1244 included in end node 1200 for processing, after which the data information is sent from the end node 1200 to the access node 1300, e.g., by way of wireless communication interface module 1204. Following reception by access node 1300, e.g., by way of wireless communication interface module 1308, the data information, e.g., traffic flows comprising a sequence of messages, packets, or frames, sent from the application module 1228 in end node 1200 to the corresponding node is shown by a sequence of arrows 1410-1418 to proceed through a sequence of modules 1338-1344 included in access node 1300 for processing, prior to being forwarded from the access node 1300 toward the corresponding node, e.g., directed in accordance with routing information to an intermediate node connected to the access node by way of network/internetwork interface module 1306.

The data information, e.g., traffic flows comprising a sequence of messages, packets, or frames, sent from a corresponding node to application module 1228 in end node 1228 is shown by a sequence of arrows 1420-1428 to be received by access node 1300, e.g., by way of network/internetwork interface module 1306, and then to proceed through a sequence of modules 1346-1354 included in access node 1300 for processing, after which the data information is sent from the access node 1300 to the end node 1200, e.g., via the wireless communication interface module 1308. Following reception by end node 1200, e.g., by way of wireless communication interface module 1204, the data information, e.g., traffic flows comprising a sequence of messages, packets, or frames, sent from the corresponding node to application module 1228 in end node 1200 is shown by a sequence of arrows 1430-1434 to proceed through a sequence of modules 1246 and 1248 included in end node 1200 for processing, prior to being delivered to the application module 1228 in end node 1200.

In addition to the exchange of data information, e.g., traffic flows, FIG. 14 also depicts the exchange of control information, e.g., signaling flows and/or communication interfaces. In particular, the FIG. 14 example depicts the exchange of control information between control signaling module 1326 and traffic control module 1328 included in access node 1300. Similarly, the FIG. 14 example depicts the exchange of control information between control signaling module 1226 and the traffic control module 1230 included in the end node 1200. In both access node 1300 and end node 1200, exchange of control information between the modules as shown allows the respective control signaling module 1326/1226 in the access/end node 1300/1200 to affect, e.g., set, modify, and/or monitor, the configuration and/or operation of the various modules included in the respective traffic control module 1328/1230, as needed to provide the proper quality of service treatment of the data information, e.g., traffic flows, to/from the application module 1228 in the end node 1200.

The exchange of control information, e.g., signaling flows and/or communication interfaces, is also shown a) between another node and control signaling module 1326 in access node 1300, b) between application module 1228 in end node 1200 and control signaling module 1226 in end node 1200, and c) between the respective control signaling modules 1326/1226 in access node 1300 and end node 1200. These exchanges of control information, e.g., signaling flows and/or communication interfaces, enable the configuration and/or operation of traffic control modules 1328/1230 in both access node 1300 and the end node 1200 to be affected by a) one or more additional nodes, e.g. the access control node 1120 and/or application server node 1126, b) application module 1228 in end node 1200, or c) a combination of one or more additional nodes and the application module 1228 in end node 1200.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A communications method for use by a mobile device having a wireless interface, comprising:
    establishing a communications link with a network-based localized mobility management system through an access component of a first network domain with a network domain node of the first network domain of the system;
    establishing at least one other communications link with the network-based localized mobility management system through at least one other access component of the first network domain with the network domain node of the system;
    requesting a quality of service through at least one of the access components, wherein the request for quality of service identifies a particular message flow from among a plurality of message flows associated with the communication links;
    sending a message to establish a first tunnel, at a first time, to the access component for use with at least some message flows of the plurality of message flows;
    sending a message to establish a second tunnel, at a second time, to the at least one other access component for use with at least some other message flows of the plurality of message flows; and
    processing concurrent communications using the first and second tunnels, wherein the first tunnel carries the particular message flow identified in the request for quality of service and wherein the second tunnel carries other message flows, wherein the concurrent communications employ the same wireless interface of the mobile device.

2. The method of claim 1, further comprising initiating a subsequent registration through an alternative path with the network domain node.

3. The method of claim 2, further comprising changing sequence information and associating the changed sequence information with the subsequent registration.

4. The method of claim 3, where changing the sequence information involves incrementing a value, decrementing a value, or updating a timestamp value.

5. The method of claim 4, where changing the sequence information is performed by one or more of a mobile terminal and a proxy node.

6. The method of claim 1, further comprising processing one or more events or triggers independently of one or more other events or triggers.

7. The method of claim 1, further comprising enabling concurrent communication via predetermined policy or via signaled policy.

8. The method of claim 1, further comprising performing a link registration through a path that includes one or more of an access point, an access node and an access router.

9. The method of claim 1, wherein the first time and the second time are different.

10. The method of claim 1, wherein the first time and the second time are substantially the same.

11. A communications apparatus of a roaming access terminal, comprising:
    a memory that retains instructions to
        request a quality of service through at least one access component of two or more access components of a first network domain, wherein the request for quality of service identifies a particular message flow from among a plurality of message flows associated with a plurality of communication links established with a network-based localized mobility management system through the access components of the first network domain;
        send a message to establish a first tunnel, at a first time, to a first access component of the two or more access components of the first network domain for use with at least some message flows of the plurality of message flows;
        send a message to establish a second tunnel, at a second time, to the at least one other access component of the two or more access components of the first network domain for use with at least some other message flows of the plurality of message flows;

process multiple concurrent link connections in the roaming access terminal, the multiple link connections established with a same network domain node of the first network domain of the network-based localized mobility management system via the two or more access components of the first network domain, a same wireless interface of the roaming access terminal, and at least one local mobility anchor and wherein the processing of multiple concurrent link communications uses the first and second tunnels, wherein the second tunnel carries the particular message flow identified in the request for quality of service and wherein the first tunnel carries other message flows; and a processor that executes the instructions.

12. The communications apparatus of claim 11, further comprising a policy component to facilitate communications over the multiple communications links.

13. The communications apparatus of claim 11, wherein the first time and the second time are different.

14. The communications apparatus of claim 11, wherein the first time and the second time are substantially the same.

15. A communications apparatus of an access terminal, comprising:

means for obtaining multiple link responses from a first network domain of a network-based localized mobility management system for at least two communication links;

means for processing the link responses from the network-based localized mobility management system;

means for requesting a quality of service through at least one access component using a first communication link of the at least two communication links, wherein the request for quality of service identifies a particular message flow from among a plurality of message flows associated with the first communication link;

means for sending a message to establish a first tunnel, at a first time, to the access component for use with at least some message flows of the plurality of message flows;

means for sending a message to establish a second tunnel, at a second time, to a second access component using a second communication link of the at least two communication links for use with at least some other message flows of the plurality of message flows;

means for communicating across multiple communication links in accordance with the link responses, the multiple communication links established with a same network domain node of the first network domain of the network-based localized mobility management system via two or more access components of the first network and a same wireless interface of the access terminal; and means for processing concurrent communications using the first and second tunnels, wherein the first tunnel carries the particular message flow identified in the request for quality of service and wherein the second tunnel carries other message flows.

16. A non-transitory machine-readable medium for use with a network-based localized mobility management system, the machine-readable medium having stored thereon machine-executable instructions for:

obtaining a request from an access terminal having a wireless interface to a first network domain of the network-based localized mobility management system;

processing the request across two or more communications links, the two or more communications links established with a same network domain node of the first network domain of the network-based localized mobility management system via two or more access components of the first network domain and a same wireless interface of the access terminal;

obtaining a quality of service request from the access terminal through at least one of the access components of the first network domain, wherein the request for quality of service identifies a particular message flow from among a plurality of message flows associated with the communication links;

establishing a first tunnel, at a first time, to a first access component of the two or more access components for use with at least some message flows of the plurality of message flows;

establishing a second tunnel, at a second time, to a second access component of the two or more access components for use with at least some other message flows of the plurality of message flows; and processing concurrent communications using the first and second tunnels, wherein the first tunnel carries the particular message flow identified in the request for quality of service and wherein the second tunnel carries other message flows.

17. The machine-readable medium of claim 16, wherein the instructions further comprise processing one or more triggers independently from at least one other trigger.

18. A processor for use with a network-based localized mobility management system wherein the processor executes the following instructions:

processing data across multiple concurrent communications links from a first network domain of the network-based localized mobility management system, the multiple concurrent communications links established with a same network domain node of the first network domain of the network-based localized mobility management system via two or more access components of the first network domain wherein the concurrent communications employ the same wireless interface of the access terminal;

obtaining a quality of service request from the access terminal through at least one of the access components of the first network domain, wherein the request for quality of service identifies a particular message flow from among a plurality of message flows associated with the communication links;

establishing a first tunnel, at a first time, to a first access component of the two or more access components for use with at least some message flows of the plurality of message flows;

establishing a second tunnel, at a second time, to a second access component of the two or more access components for use with at least some other message flows of the plurality of message flows; and processing concurrent communications using the first and second tunnels, wherein the first tunnel carries the particular message flow identified in the request for quality of service and wherein the second tunnel carries other message flows.

19. A communications method for a first network domain of a network-based localized mobility management system, comprising:

establishing a communications link to an access terminal having a wireless interface through an access component of the first network domain of the network-based localized mobility management system;

establishing at least one other communications link to the access terminal through at least one other access component of the first network domain of the network-based localized mobility management system;

obtaining a quality of service request from the access terminal request through at least one of the access components, wherein the request for quality of service identifies a particular message flow from among a plurality of message flows associated with the communication links; and enabling concurrent communications with a network domain node of the first network domain via the access component and the at least one other access component of the network-based localized mobility management system wherein the concurrent communications employ the same wireless interface of the access terminal;

establishing a first tunnel, at a first time, to the access component for use with at least some message flows of the plurality of message flows;

establishing a second tunnel, at a second time, to the at least one other access component for use with at least some other message flows of the plurality of message flows; and processing concurrent communications using the first and second tunnels, wherein the first tunnel carries the particular message flow identified in the request for quality of service and wherein the second tunnel carries other message flows.

20. The method of claim 19, the network domain node is a local mobility anchor.

21. The method of claim 19, the access component is an access router.

22. The method of claim 19, further comprising processing one or more of a link state trigger and a quality of service trigger.

23. The method of claim 19, further comprising one or more of registering a link on a link up trigger and deregistering a link on a link down trigger.

24. The method of claim 19, further comprising processing multiple communications links as alternative links that send message flows to one or more communications links.

25. The method of claim 19, further comprising initiating a flow-specific registration in view of a quality of service request.

26. The method of claim 19, further comprising performing a flow-specific deregistration.

27. The method of claim 19, further comprising processing multicasting requests or unicast requests.

28. The method of claim 19, further comprising employing a context transfer component to communicate with other existing links.

29. The method of claim 19, further comprising:
generating a Proxy Mobile Internet Protocol (PMIP) to assist in the control of the concurrent communications.

30. The method of claim 19, further comprising:
generating a Networked-Based Localized Mobility Management (NETLMM) protocol to assist in the control of the concurrent communications.

31. The method of claim 19, further comprising:
employing a Local Mobility Anchor to assist in the control of the concurrent communications.

32. A communications apparatus of a roaming access terminal, comprising:
a memory that retains instructions to
create multiple concurrent link connections in the roaming access terminal, the multiple link connections established with a same network domain node of a first network domain of a network-based localized mobility management system via two or more access components of the first network domain, a same wireless interface of the roaming access terminal, and at least one local mobility anchor of the network-based localized mobility management system;

request a quality of service through at least one access component of the first network domain, wherein the request for quality of service identifies a particular message flow from among a plurality of message flows associated with a plurality of communication links established with a network-based localized mobility management system through the access components of the first network domain; and sending a message to establish a first tunnel, at a first time, to the at least one access component of the two or more access components of the first network domain for use with at least some message flows of the plurality of message flows;

sending a message to establish a second tunnel, at a second time, to a second access component of the two or more access components of the first network domain for use with at least some other message flows of the plurality of message flows;

process concurrent communications using the first and second tunnels, wherein the first tunnel carries the particular message flow identified in the request for quality of service and wherein the second tunnel carries other message flows; and a processor that executes the instructions.

33. A communications apparatus of a network-based localized mobility management system, comprising:
means for generating multiple link responses from a first network domain of the network-based localized mobility management system;

means for processing the link responses of the network-based localized mobility management system;

means obtaining quality of service requests through at least one of access component of two or more access components of the first network domain, wherein the request for quality of service identifies a particular message flow from among a plurality of message flows associated with a plurality of communication links; and means for communicating with an access terminal across multiple communication links in accordance with the link responses, the multiple communication links established with a same network domain node of the first network domain via the two or more access components of the first network domain and a same wireless interface of the access terminal;

means for establishing a first tunnel, at a first time, to a first access component of the two more access components for use with at least some message flows of the plurality of message flows;

means for establishing a second tunnel, at a second time, to a second access component of the two or more access components for use with at least some other message flows of the plurality of message flows; and means for processing concurrent communications using the first and second tunnels, wherein the first tunnel carries the particular message flow identified in the request for quality of service and wherein the second tunnel carries other message flows.

34. A non-transitory machine-readable medium for use with an access terminal, the machine-readable medium having stored thereon machine-executable instructions for:

obtaining a response to a link request from a first network domain of a network-based localized mobility management system;

requesting a quality of service through at least one access component of the first network domain, wherein the request for quality of service identifies a particular message flow from among a plurality of message flows associated with a plurality of communication links established with the network-based localized mobility management system through at least two access components of the first network domain;

sending a message to establish a first tunnel, at a first time, to the at least one access component of the first network domain for use with at least some message flows of the plurality of message flows;

sending a message to establish a second tunnel, at a second time, to the a second access component of the first network domain for use with at least some other message flows of the plurality of message flows; and processing the request across two or more communications links, the two or more communications links established with a same network domain node of the first network domain of the network-based localized mobility management system via two or more access components of the first network domain and a same wireless interface of the access terminal and processing concurrent communications using the first and second tunnels, wherein the first tunnel carries the particular message flow identified in the request for quality of service and wherein the second tunnel carries other message flows.

35. A processor of an access terminal that executes the following instructions:

establishing multiple concurrent communication links with a first network domain of a network-based localized mobility management system, the multiple concurrent communications links established with a same network domain node of the first network domain of the network-based localized mobility management system via two or more access components of the first network domain and a same wireless interface of the access terminal;

requesting a quality of service through at least one access component of the first network domain, wherein the request for quality of service identifies a particular message flow from among a plurality of message flows associated with the communication links established with the network-based localized mobility management system through the two or more access components of the first network domain;

sending a message to establish a first tunnel, at a first time, to the at least one access component for use with at least some message flows of the plurality of message flows;

sending a message to establish a second tunnel, at a second time, to a second access component for use with at least some other message flows of the plurality of message flows; and processing multiple concurrent link communications using the first and second tunnels, wherein the second tunnel carries the particular message flow identified in the request for quality of service and wherein the first tunnel carries other message flows.

* * * * *